(12) United States Patent
Lin

(10) Patent No.: US 11,277,418 B2
(45) Date of Patent: *Mar. 15, 2022

(54) NETWORK ATTACK DETERMINATION METHOD, SECURE NETWORK DATA TRANSMISSION METHOD, AND CORRESPONDING APPARATUS

(71) Applicant: ALIBABA GROUP HOLDING LIMITED, Grand Cayman (KY)

(72) Inventor: Yufei Lin, Guangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 10 days.

This patent is subject to a terminal disclaimer.

(21) Appl. No.: 16/773,910

(22) Filed: Jan. 27, 2020

(65) Prior Publication Data

US 2020/0162490 A1    May 21, 2020

Related U.S. Application Data

(63) Continuation of application No. 15/505,835, filed as application No. PCT/CN2016/078843 on Apr. 8, 2016, now Pat. No. 10,574,673.

(30) Foreign Application Priority Data

Jul. 15, 2015  (CN) .......................... 201510416039.6
Jul. 15, 2015  (CN) .......................... 201510416040.9

(51) Int. Cl.
  *H04L 29/06*    (2006.01)
(52) U.S. Cl.
  CPC ...... *H04L 63/1416* (2013.01); *H04L 63/0236* (2013.01); *H04L 63/1408* (2013.01);
(Continued)

(58) Field of Classification Search
  CPC ............. H04L 63/0236; H04L 63/0428; H04L 63/1408; H04L 63/1416; H04L 63/1425; H04L 63/1466; H04L 63/168
  See application file for complete search history.

(56) References Cited

U.S. PATENT DOCUMENTS 7,853,678 B2   12/2010  Khemani et al.
7,865,589 B2    1/2011  Khemani et al.
(Continued)

FOREIGN PATENT DOCUMENTS

CN   102761500 A   10/2012
CN   102902928 A    1/2013
(Continued)

OTHER PUBLICATIONS

Chris Grier et al., "Secure web browsing with the OP web browser", 2008 IEEE Symposium on Security and Privacy, Downloaded from IEEE Xplore on Oct. 17, 2008, pp. 402-416.
(Continued)

*Primary Examiner* — Joseph P Hirl
*Assistant Examiner* — Ka Shan Choy
(74) *Attorney, Agent, or Firm* — Sheppard Mullin Richter & Hampton LLP

(57) ABSTRACT

This application discloses a network attack determination method, a secure network data transmission method, and a corresponding apparatus. In this application, a browser client terminal obtains attack rules formulated by a rule configuration server, and after obtaining feedback information that is returned by a network according to a webpage browsing request, determines, according to a comparison result between the attack rules and the feedback information, whether the webpage browsing request encounters a network attack, thereby resolving a problem in the prior art that a network attack cannot be identified. In addition, after
(Continued)

```
                            ┌─── S11
┌─────────────────────────────────────────────┐
│ Obtain feedback information that is returned by a │
│ network according to a webpage browsing request  │
└─────────────────────────────────────────────┘
                    │
                    ▼        ┌─── S12
┌─────────────────────────────────────────────┐
│ Compare obtained attack rules with the feedback │
│ information, to determine, according to a comparison │
│ result, whether the webpage browsing request │
│ encounters a network attack │
└─────────────────────────────────────────────┘
``` determining that a network attack is encountered, the browser client terminal performs network data transmission in a secure manner, which can avoid impact from the network attack, and improve security of network data transmission.

18 Claims, 9 Drawing Sheets

(52) U.S. Cl.
CPC ...... *H04L 63/0428* (2013.01); *H04L 63/1425* (2013.01); *H04L 63/1466* (2013.01); *H04L 63/168* (2013.01)

(56) References Cited

U.S. PATENT DOCUMENTS

| | | | |
|---|---|---|---|
| 7,934,253 | B2 | 4/2011 | Overcash |
| 8,423,476 | B2 | 4/2013 | Bishop et al. |
| 8,429,751 | B2 | 4/2013 | Mizrahi et al. |
| 8,490,148 | B2 | 7/2013 | Sikka et al. |
| 8,607,340 | B2 | 12/2013 | Wright |
| 8,613,089 | B1 * | 12/2013 | Holloway ........... H04L 63/1458 726/23 |
| 8,739,243 | B1 * | 5/2014 | Martini ............... H04L 63/0471 726/1 |
| 9,027,136 | B2 | 5/2015 | Be'ery et al. |
| 9,609,020 | B2 | 3/2017 | White et al. |
| 9,654,495 | B2 | 5/2017 | Hubbard et al. |
| 9,973,534 | B2 | 5/2018 | Mahaffey et al. |
| 2007/0118669 | A1 | 5/2007 | Rand et al. |
| 2010/0037317 | A1 | 2/2010 | Oh |
| 2010/0115594 | A1 | 5/2010 | Paya et al. |
| 2010/0269149 | A1 * | 10/2010 | Lee ........................ H04L 63/168 726/1 |
| 2012/0066738 | A1 | 3/2012 | Cohan |
| 2012/0198549 | A1 * | 8/2012 | Antonakakis ....... H04L 61/1511 726/22 |
| 2012/0304275 | A1 | 11/2012 | Ji et al. |
| 2012/0304292 | A1 * | 11/2012 | Liu ..................... H04L 63/1408 726/22 |
| 2013/0195457 | A1 * | 8/2013 | Levy .................. H04L 47/2416 398/66 |
| 2013/0311677 | A1 * | 11/2013 | Coulson .............. H04L 61/1511 709/245 |
| 2014/0351573 | A1 | 11/2014 | Martini |
| 2014/0380477 | A1 | 12/2014 | Li et al. |
| 2015/0281244 | A1 * | 10/2015 | Wen ........................ H04L 63/20 726/1 |
| 2015/0334094 | A1 | 11/2015 | Suresh et al. |
| 2015/0358276 | A1 * | 12/2015 | Liu ..................... H04L 61/1511 726/1 |
| 2016/0006760 | A1 * | 1/2016 | Lala .................... H04L 63/1416 726/23 |
| 2016/0099961 | A1 * | 4/2016 | Paugh ............... G06F 16/90335 726/23 |
| 2016/0337378 | A1 * | 11/2016 | Wan ....................... G06Q 20/12 |
| 2017/0223039 | A1 * | 8/2017 | Mont .................. H04L 63/1466 |
| 2017/0295132 | A1 * | 10/2017 | Li ........................ H04L 63/045 |

FOREIGN PATENT DOCUMENTS

| | | |
|---|---|---|
| CN | 103532912 A | 1/2014 |
| CN | 103605926 A | 2/2014 |
| CN | 103744802 A | 4/2014 |
| CN | 104079673 B | 12/2014 |
| CN | 104219200 A | 12/2014 |
| CN | 104239577 A | 12/2014 |
| CN | 104348789 A | 2/2015 |
| CN | 104468865 A | 3/2015 |
| CN | 104954346 A | 9/2015 |
| RU | 2480937 C2 | 4/2013 |

OTHER PUBLICATIONS

Zachary Weinberg et al., "I Still Know What You Visited Last Summer, Leaking browser history via user interaction and side channel attacks", 2011 IEEE Symposium on Security and Privacy, 2011, pp. 147-161.
Collin Jackson et al., "Protecting Browser State from Web Privacy Attacks", Minor revision of the work published in Proceedings of the 15th International Conference on World Wide Web, http://doi.acm.org/10.1145/1135777.1135884, Updated Oct. 19, 2007, pp. 737-744.
Gunes Acar et al., "The Web Never Forgets: Persistent Tracking Mechanisms in the Wild", Proceedings of the 2014 ACM SIGSAC Conference on Computer and Communications Security, Nov. 3-7, 2014, Scottsdale, AZ, pp. 374-689.
Krishna Chaitanya Telikicherla et al., "CORP: A Browser Policy to Mitigate Web Infiltration Attacks", Dec. 2014 (24 pages).
Decision to Grant dated Feb. 22, 2019, issued in related Russian Application No. 2017114862 (28 pages), with t::nglish translation.
First Search dated Feb. 25, 2019, issued in related Chinese Application No. 201510416039.6 (2 pages).
First Office Action dated Mar. 5, 2019, issued in related Chinese Application No. 201510416039.6 (17 pages), w/English machine translation.
First Search dated Feb. 20, 2019, issued in related Chinese Application No. 201510416040.9 (2 pages).
First Office Action dated Mar. 4, 2019, issued in related Chinese Application No. 201510416040.9 (15 pages), w/English machine translation.
Official Action dated Oct. 4, 2018, issued in related Russian Application No. 2017114862(7 pages).
Search Report dated Oct. 4, 2018, issued in related Russian Application No. 2017114862(5 pages).
PCT International Preliminary Report on Patentability dated Jan. 25, 2018, issued in related International Application No. PCT/CN2016/078843 (12 pages).
International Search report and Written Opinion for Application No. PCT/CN2016/078843, dated Jun. 30, 2016, 9 pages.
Supplementary Search dated Aug. 31, 2019, issued in related Chinese Application No. 201510416039.6 (2 pages).
Second Office Action dated Sep. 9, 2019, issued in related Chinese Application No. 201510416039.6, with English machine translation (13 pages).
First Examination Report dated Sep. 25, 2019, issued in related Indian Application No. 201747007436 (6 pages).
First Examination Report dated Jun. 24, 2019, issued in related Indonesian Application No. PID201702110, with English machine translation (5 pages).

* cited by examiner

NETWORK ATTACK DETERMINATION METHOD, SECURE NETWORK DATA TRANSMISSION METHOD, AND CORRESPONDING APPARATUS

This application is a continuation of U.S. patent application Ser. No. 15/505,835, filed on Feb. 22, 2017, which is a national phase application of International Application No. PCT/CN2016/078843, filed on Apr. 8, 2016, which claims priority to Chinese Patent Application No. 201510416039.6, filed with the Chinese Patent Office on Jul. 15, 2015 and entitled "NETWORK ATTACK DETERMINATION METHOD, SECURE NETWORK DATA TRANSMISSION METHOD, AND CORRESPONDING APPARATUS", and Chinese Patent Application No. 201510416040.9, filed with the Chinese Patent Office on Jul. 15, 2015 and entitled "NETWORK ATTACK DETERMINATION METHOD, SECURE NETWORK DATA TRANSMISSION METHOD, AND CORRESPONDING APPARATUS". All of the above-referenced applications are incorporated herein by reference in their entireties.

TECHNICAL FIELD

The present disclosure relates to the field of webpage browsing technologies, and in particular, to a network attack determination method, a secure network data transmission method, and a corresponding apparatus.

BACKGROUND

With increasing development of modern science and technology, the amount of information increases sharply. In this situation, browsing webpages by using a browser becomes a common way of obtaining information.

The browser is software that can display webpage content for browsing by a user. If the user needs to browse a webpage, the browser generates a corresponding webpage browsing request according to a user operation, and transmits the webpage browsing request to a DNS server. The DNS server performs domain name resolution, and transmits a domain name resolution result to the browser, where the domain name resolution result includes an IP address corresponding to a domain name that currently needs to be accessed. After the browser receives the domain name resolution result, the browser accesses a server according to the IP address, to obtain corresponding webpage data, and displays webpage content corresponding to the webpage data, to satisfy a browsing requirement of the user.

However, the webpage browsing request sometimes encounters a network attack. As a result, an error occurs in the domain name resolution result received by the browser, but the browser cannot identify whether a network attack is encountered. In addition, when encountering a network attack, the browser cannot obtain a correct IP address, resulting in that the browser cannot obtain required webpage data, and the user cannot browse required information.

SUMMARY

To overcome a problem in related technologies, the present disclosure provides a network attack prevention method, apparatus, and system.

In order to resolve the foregoing technical problem, the embodiments of the present disclosure disclose the following technical solutions:

According to a first aspect of the embodiments of the present disclosure, a network attack determination method is provided, applied to a browser client terminal, where the network attack determination method includes: obtaining feedback information that is returned by a network according to a webpage browsing request; and comparing obtained attack rules with the feedback information, to determine, according to a comparison result, whether the webpage browsing request encounters a network attack, where the attack rules are sent by a rule configuration server.

Further, the feedback information is domain name resolution information.

Further, the comparing obtained attack rules with the feedback information, to determine, according to a comparison result, whether the webpage browsing request encounters a network attack includes: determining, according to the attack rules and the domain name resolution information, legality of an IP address included in the domain name resolution information; and determining, according to the legality of the IP address included in the domain name resolution information, whether the webpage browsing request encounters a network attack, and if the IP address is legal, determining that the webpage browsing request encounters no network attack, or if the IP address is illegal, determining that the webpage browsing request encounters a network attack.

Further, the determining, according to the attack rules and the domain name resolution information, legality of an IP address included in the domain name resolution information includes: obtaining a target attack rule in the attack rules by using the webpage browsing request, where the attack rules include a domain name, an IP address, and a rule type identifier, and a domain name included in the target attack rule is the same as a to-be-accessed domain name in the webpage browsing request; traversing the target attack rule, to determine whether the IP address included in the domain name resolution information is included in the target attack rule; and if the IP address included in the domain name resolution information is not included in the target attack rule, determining that the IP address included in the domain name resolution information is legal; or if the IP address included in the domain name resolution information is included in the target attack rule, determining, according to the target attack rule, whether the IP address included in the domain name resolution information is legal, and if a rule type identifier, in the target attack rule, corresponding to the IP address included in the domain name resolution information is a legal identifier, determining that the IP address is legal, or if a rule type identifier, in the target attack rule, corresponding to the IP address included in the domain name resolution information is an illegal identifier, determining that the IP address is illegal.

Further, the feedback information is response information that is returned by the network according to the webpage browsing request.

Further, the comparing obtained attack rules with the feedback information, to determine, according to a comparison result, whether the webpage browsing request encounters a network attack includes: obtaining a target attack rule in the attack rules by using the webpage browsing request, where the attack rules include a tempering keyword, a non-tempered information expression, and a tempered information expression, and the non-tempered information expression included in the target attack rule corresponds to the webpage browsing request; traversing the target attack rule, to determine whether a response header keyword in the response information matches a tempering keyword in the target attack rule; if the response header keyword in the response information matches the tempering keyword in the target attack rule, determining whether response header content in the response information matches a tempered information expression in the target attack rule; and if the response header content matches the tempered information expression in the target attack rule, determining that the webpage browsing request encounters a network attack.

Further, the information expression is a uniform resource locator (URL) address expression, a channel number expression, or a media type expression.

According to a second aspect of the embodiments of the present disclosure, a secure network data transmission method is provided, applied to a browser client terminal, where the network attack determination method includes: obtaining feedback information that is returned by a network according to a webpage browsing request; comparing obtained attack rules with the feedback information, to determine, according to a comparison result, whether the webpage browsing request encounters a network attack, where the attack rules are sent by a rule configuration server; and if determining that the webpage browsing request encounters a network attack, performing network data transmission in a secure manner.

Further, the performing network data transmission in a secure manner includes: after encrypting the webpage browsing request, sending an encrypted webpage browsing request to a proxy server, so that the proxy server decrypts the encrypted webpage browsing request, performs domain name resolution on a decrypted webpage browsing request, accesses a target server corresponding to a domain name resolution result, to obtain network data corresponding to the decrypted webpage browsing request, and encrypts the network data; and receiving encrypted network data returned by the proxy server.

Further, the secure network data transmission method further includes: after determining that the webpage browsing request encounters a network attack, discarding the domain name resolution information.

According to a third aspect of the embodiments of the present disclosure, a secure network data transmission method is provided, applied to a rule configuration server, where the secure network data transmission method includes: formulating attack rules according to a received operation; and transmitting the attack rules to a browser client terminal, so that the browser client terminal determines, according to the attack rules, whether a network attack is encountered.

Further, the transmitting the attack rules to a browser client terminal, so that the browser client terminal determines, according to the attack rules, whether a network attack is encountered includes: obtaining a webpage browsing request transmitted by the browser client terminal, and obtaining, according to the webpage browsing request, an IP address to be accessed by the browser client terminal; querying the formulated attack rules for attack rules corresponding to a region and an operator indicated by the IP address; and transmitting the attack rules corresponding to the region and the operator indicated by the IP address to the browser client terminal, so that the browser client terminal determines, according to the attack rules, whether a network attack is encountered.

According to a fourth aspect of the embodiments of the present disclosure, a network attack determining apparatus is provided, applied to a browser client terminal, where the network attack determining apparatus includes: a feedback information obtaining module, configured to obtain feedback information that is returned by a network according to a webpage browsing request; and a determining module, configured to compare obtained attack rules with the feedback information, to determine, according to a comparison result, whether the webpage browsing request encounters a network attack, where the attack rules are sent by a rule configuration server.

Further, the feedback information is domain name resolution information or response information.

Further, the determining module includes: an IP address legality determining unit, configured to determine, according to the attack rules and the domain name resolution information, legality of an IP address included in the domain name resolution information; and a network attack determining unit, configured to determine, according to the legality of the IP address included in the domain name resolution information, whether the webpage browsing request encounters a network attack, and if the IP address is legal, determine that the webpage browsing request encounters no network attack, or if the IP address is illegal, determine that the webpage browsing request encounters a network attack.

According to a fifth aspect of the embodiments of the present disclosure, a secure network data transmission apparatus is provided, applied to a browser client terminal, where the secure network data transmission apparatus includes: a feedback information obtaining module, configured to obtain feedback information that is returned by a network according to a webpage browsing request; a determining module, configured to compare obtained attack rules with the feedback information, to determine, according to a comparison result, whether the webpage browsing request encounters a network attack, where the attack rules are sent by a rule configuration server; and a transmission module, configured to: if it is determined that the webpage browsing request encounters a network attack, perform network data transmission in a secure manner.

According to a sixth aspect of the embodiments of the present disclosure, a secure network data transmission apparatus is provided, applied to a rule configuration server, where the secure network data transmission apparatus includes: an attack rule formulation module, configured to formulate attack rules according to a received operation; and an attack rule transmission module, configured to transmit the attack rules to a browser client terminal, so that the browser client terminal determines, according to the attack rules, whether a network attack is encountered.

Further, the attack rule transmission module is specifically configured to obtain a webpage browsing request transmitted by the browser client terminal, and obtain, according to the webpage browsing request, an IP address to be accessed by the browser client terminal; query the formulated attack rules for attack rules corresponding to a region and an operator indicated by the IP address; and transmit the attack rules corresponding to the region and the operator indicated by the IP address to the browser client terminal, so that the browser client terminal determines, according to the attack rules, whether a network attack is encountered.

According to a seventh aspect of the embodiments of the present disclosure, a secure network data transmission system is provided, including: a rule configuration server, a proxy server, and a user terminal, where the user terminal is provided with a browser client terminal, where the rule configuration server is configured to formulate attack rules according to a received operation, and transmit the attack rules to the browser client terminal of the user terminal; and the browser client terminal of the user terminal is configured to: after obtaining feedback information that is returned by a network according to a webpage browsing request, compare the attack rules with the feedback information, to determine, according to a comparison result, whether the webpage browsing request encounters a network attack, and if determining that the webpage browsing request encounters a network attack, perform network data transmission with the proxy server in a secure manner.

Further, the rule configuration server is specifically configured to formulate the attack rules according to the received operation, obtain the webpage browsing request transmitted by the browser client terminal of the user terminal, and obtain, according to the webpage browsing request, an IP address to be accessed by the browser client terminal; query the formulated attack rules for attack rules corresponding to a region and an operator indicated by the IP address; and transmit the attack rules corresponding to the region and the operator indicated by the IP address to the browser client terminal; and the browser client terminal of the user terminal is specifically configured to: obtain domain name resolution information that is returned by the network according to the webpage browsing request, compare the attack rules transmitted by the rule configuration server with the domain name resolution information, to determine, according to a comparison result, whether the webpage browsing request encounters a network attack, and if determining that the webpage browsing request encounters a network attack, perform network data transmission with the proxy server in a secure manner.

According to an eighth aspect of the embodiments of the present disclosure, a computer-readable medium having non-volatile program code executable by a processor is provided, where when executed by the processor, the program code causes the processor to execute the following method:

obtaining feedback information that is returned by a network according to a webpage browsing request; and comparing obtained attack rules with the feedback information, to determine, according to a comparison result, whether the webpage browsing request encounters a network attack, where the attack rules are sent by a rule configuration server.

The technical solutions provided in the embodiments of the present disclosure may include the following beneficial effects:

This application discloses a network attack determination method, a secure network data transmission method, and a corresponding apparatus. In this application, a browser client terminal obtains attack rules formulated by a rule configuration server, and after obtaining feedback information that is returned by a network according to a webpage browsing request, determines, according to a comparison result between the attack rules and the feedback information, whether the webpage browsing request encounters a network attack, thereby resolving a problem in the prior art that a network attack cannot be identified. In addition, after determining that a network attack is encountered, the browser client terminal performs network data transmission in a secure manner, which can avoid impact from the network attack, and improve security of network data transmission.

It will be appreciated that the above general description and the following detailed description are merely exemplary and explanatory, and do not limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

To resolve a problem in the prior art that during webpage browsing, when encountering a network attack, a browser cannot identify the network attack, and the browser usually cannot obtain a correct IP address, and cannot obtain required webpage data, resulting in that a user cannot browse required information, this application discloses a network attack determination method, a secure network data transmission method, and a corresponding apparatus.

Figure 1:
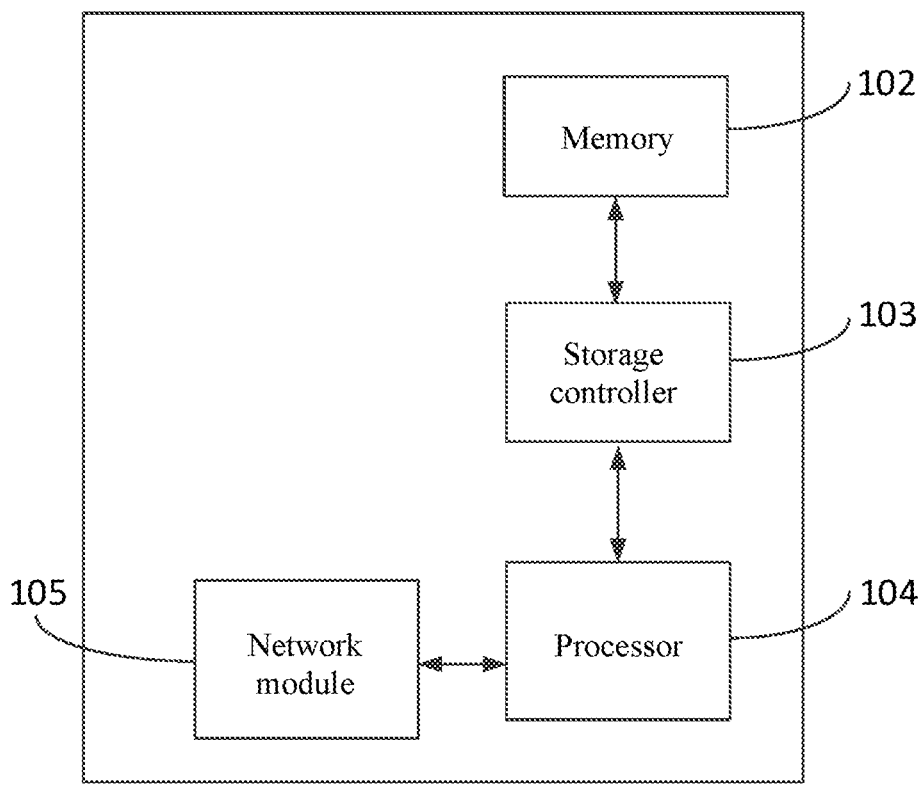
FIG. 1 is a structural block diagram of an electronic device according to an exemplary embodiment.

FIG. 1 shows a structural block diagram of an electronic device 100 that may be applied to an embodiment of this application. The electronic device may be a user terminal, or may be a server. As shown in FIG. 1, the electronic device 100 may include a memory 102, a storage controller 103, a processor 104, and a network module 105.

The memory 102, the storage controller 103, the processor 104, and the network module 105 are electrically connected directly or indirectly, to implement data transmission or exchange. For example, these components may be electrically connected by using one or more communications buses or signal buses. The network attack determination method and the secure network data transmission method include at least one software function module that can be stored in the memory 102 in a software or firmware form, for example, a software function module or a computer program included in the search term similarity calculation apparatus or the search term searching apparatus.

The memory 102 may store various software programs and modules, for example, program instructions/modules corresponding to the search term similarity calculation method and apparatus provided in the embodiments of this application or program instructions/modules corresponding to the search term searching method and apparatus provided in the embodiments of this application. The processor 104 runs the software programs and modules in the memory 102, to execute various function applications and data processing, that is, implement the search term similarity calculation method or the search term searching method in the embodiments of this application. The memory 102 may include but not limited to a random access memory (RAM), a read-only memory (ROM), a programmable read-only memory (PROM), an erasable programmable read-only memory (EPROM), an electric erasable programmable read-only memory (EEPROM), and the like.

The processor 104 may be an integrated circuit chip and has a signal processing capability. The processor may be a general-purpose processor, including a central processing unit (CPU), a network processor (NP), and the like; or may be a digital signal processor (DSP), an application-specific integrated circuit (ASIC), a field programmable gate array (FPGA), or another programmable logical device, discrete gate or transistor logic device, or discrete hardware assembly. The processor 104 may implement or execute methods, steps, and logical block diagrams disclosed in the embodiments of this application. The general-purpose processor may be a microprocessor or the processor may be any conventional processor or the like.

The network module 105 is configured to receive and send a network signal. The network signal may be a wireless signal or a wired signal.

It may be understood that, the structure shown in FIG. 1 is merely an example, and the electronic device 100 may include more or fewer components than those shown in FIG. 1, or has a configuration different from that shown in FIG. 1. The components shown in FIG. 1 may be implemented by using hardware, software, or a combination thereof.

Figure 2:
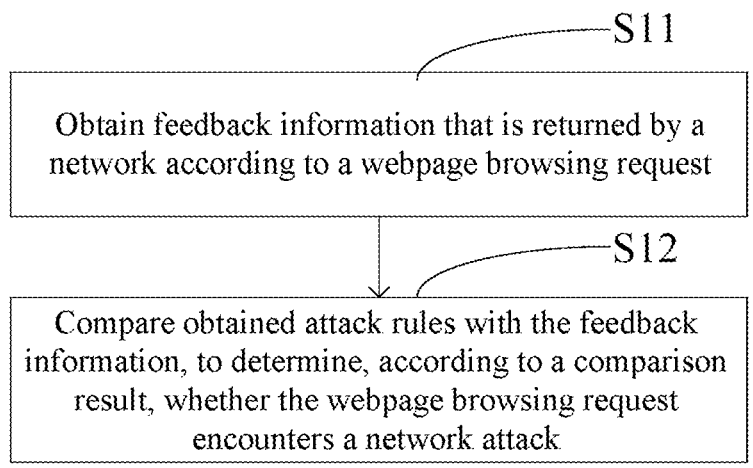
FIG. 2 is a schematic flowchart of a network attack determination method according to an exemplary embodiment.

Referring to a schematic flowchart shown in FIG. 2, in a first embodiment, this application discloses a network attack determination method, where the method is applied to a browser client terminal, and the network attack determination method includes:

Step S11: Obtain feedback information that is returned by a network according to a webpage browsing request.

If the browser client terminal encounters a network attack when requesting webpage data, feedback data returned by the network may be tempered. Therefore, after obtaining the feedback information returned by the network, the browser client terminal may further perform data processing on the feedback information, to determine whether the browser client terminal encounters a network attack when requesting webpage data. The network attack may occur in different nodes in the network, and the feedback information may be but not limited to: domain name resolution information and response information that is returned by the network according to the webpage browsing request.

The domain name resolution information may be returned from a domain name resolution server. For example, if a user needs to browse a webpage, the browser client terminal generates a webpage browsing request according to a webpage browsing request operation of the user. Before the webpage browsing request is transmitted to a webpage server, domain name resolution information of the webpage browsing request needs to be obtained from the domain name resolution server. The response information may be returned by a target server. For example, if a user needs to browse a webpage, the browser client terminal generates a webpage browsing request, and transmits the webpage browsing request to the target server. During transmission, the network returns response information corresponding to the webpage browsing request.

Step S12: Compare obtained attack rules with the feedback information, to determine, according to a comparison result, whether the webpage browsing request encounters a network attack, where the attack rules are sent by a rule configuration server.

In this application, the rule configuration server formulates attack rules, and the rule configuration server transmits the attack rules to the browser client terminal.

After the feedback information is obtained, whether the browser client terminal encounters a network attack when requesting webpage data may be determined by checking whether the feedback information is tempered or has a data error. For example, the domain name resolution server may encounter a network attack when parsing the webpage browsing request, leading to an error in domain name resolution; or encounter a network attack when transmitting the domain name resolution information to the browser client terminal, resulting in that an IP address in the domain name resolution information is tempered. As a result, the IP address included in the domain name resolution information is an erroneous IP address, and the browser client terminal cannot obtain a correct IP address, and cannot obtain required webpage data. For another example, after the browser client terminal sends the webpage browsing request, a node in the network redirects the current webpage browsing request to an illegal target address, or changes a channel number corresponding to the webpage browsing request.

The network attack determination method disclosed in this application is applied to a browser client terminal. In the method, after obtaining feedback information that is returned by a network according to a webpage browsing request, the browser client terminal compares attack rules with the feedback information, to determine, according to a comparison result, whether the webpage browsing request encounters a network attack, thereby identifying whether a network attack is encountered.

Further, when whether a network attack is encountered is determined by checking the domain name resolution information, the comparing obtained attack rules with the feedback information, to determine, according to a comparison result, whether the webpage browsing request encounters a network attack includes:

firstly, determining, according to the attack rules and the domain name resolution information, legality of an IP address included in the domain name resolution information; and then, determining, according to the legality of the IP address included in the domain name resolution information, whether the webpage browsing request encounters a network attack, and if the IP address is legal, determining that the webpage browsing request encounters no network attack, or if the IP address is illegal, determining that the webpage browsing request encounters a network attack.

By means of the foregoing operations, whether the webpage browsing request encounters a network attack can be determined based on the legality of the IP address included in the domain name resolution information.

Figure 3:
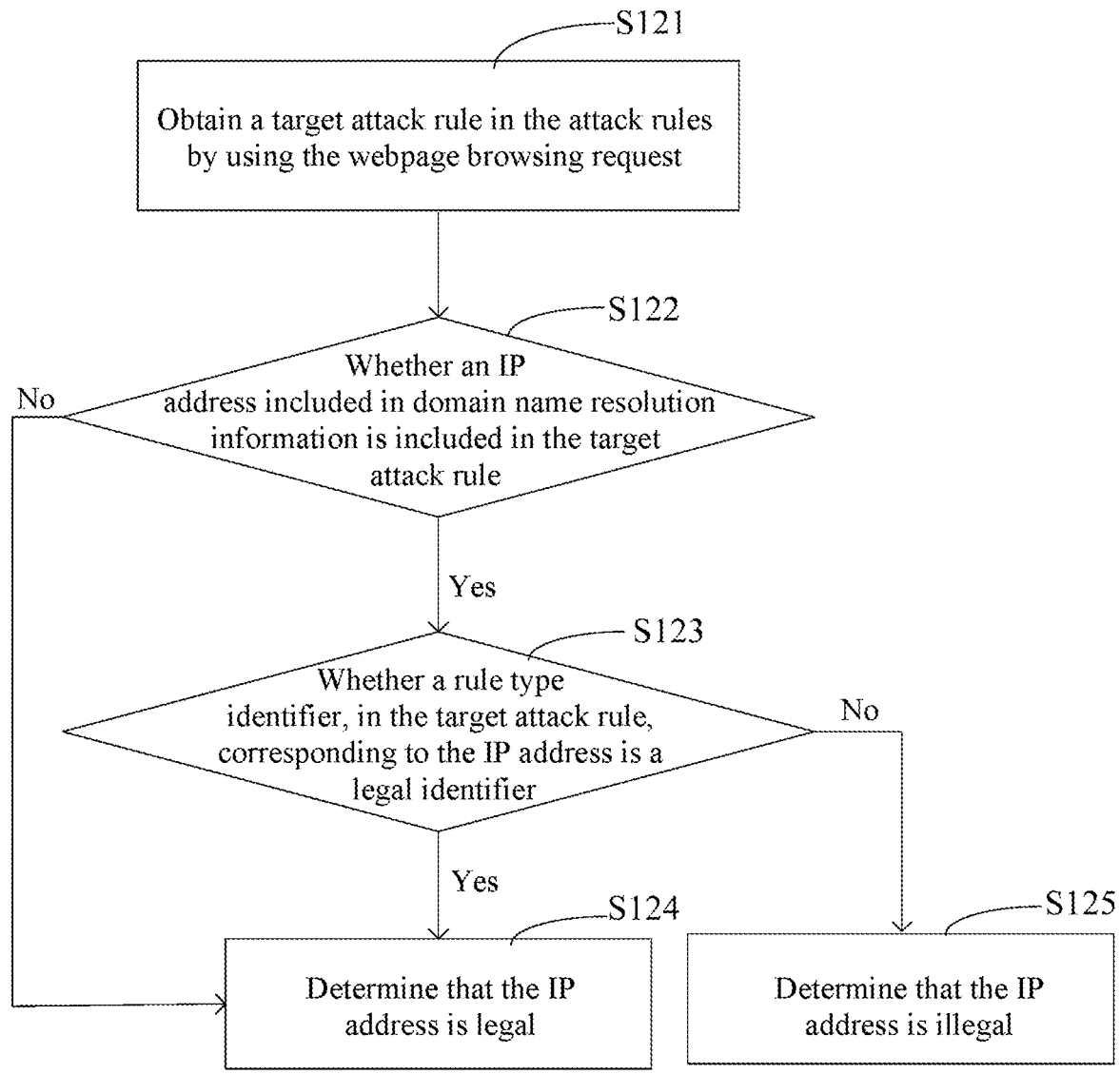
FIG. 3 is a schematic flowchart of determining legality of an IP address in a network attack determination method according to an exemplary embodiment.

In addition, referring to FIG. 3, the determining, according to the attack rules and the domain name resolution information, legality of an IP address included in the domain name resolution information includes the following steps:

Step S121: Obtain a target attack rule in the attack rules by using the webpage browsing request, where the attack rules include a domain name, an IP address, and a rule type identifier, and a domain name included in the target attack rule is the same as a to-be-accessed domain name in the webpage browsing request.

The rule type identifier included in the attack rule is used to indicate whether an IP address corresponding to the domain name is legal. If the rule type identifier is a legal identifier, it is determined that the IP address corresponding to the domain name is legal. If the rule type identifier is an illegal identifier, it is determined that the IP address corresponding to the domain name is illegal.

Step S122: Traverse the target attack rule, to determine whether the IP address included in the domain name resolution information is included in the target attack rule. If yes, execute the operation of step S123. If not, execute the operation of step S124.

Step S123: If the IP address included in the domain name resolution information is included in the target attack rule, determine whether a rule type identifier, in the target attack rule, corresponding to the IP address included in the domain name resolution information is a legal identifier. If yes, execute the operation of step S124. If not, execute the operation of step S125.

Step S124: Determine that the IP address is legal.

Step S125: If the rule type identifier, in the target attack rule, corresponding to the IP address included in the domain name resolution information, is an illegal identifier, determine that the IP address is illegal.

In step S121 to step S125 above, disclosed is a method for determining, according to the attack rules and the domain name resolution information, the legality of the IP address included in the domain name resolution information. In the method, after the target attack rule is obtained, if the IP address included in the domain name resolution information is not included in the target attack rule, it is determined that the IP address included in the domain name resolution information is legal. Alternatively, if the IP address included in the domain name resolution information is included in the target attack rule, whether the IP address included in the domain name resolution information is legal is further determined according to the target attack rule. If the rule type identifier, in the target attack rule, corresponding to the IP address included in the domain name resolution information is a legal identifier, it is determined that the IP address is legal. If the rule type identifier, in the target attack rule, corresponding to the IP address included in the domain name resolution information is an illegal identifier, it is determined that the IP address is illegal. Therefore, whether the IP address included in the domain name resolution information is legal can be determined according to the attack rules and the domain name resolution information, so that whether the webpage browsing request encounters a network attack is determined according to whether the IP address is legal.

The attack rule may have multiple forms. In a manner, a form of the attack rule is: "domain name|rule type|IP address". "|" is intended for a separation purpose, and the rule type may be "0" and "1", where "0" is an illegal identifier, and "1" is a legal identifier. Certainly, the attack rule may have any other form including a domain name, a rule type, and an IP address, which is not limited in this application. In addition, the legal identifier and the illegal identifier included in the rule type may be represented by other characters, which is not limited in this application.

In the following description, the workflow of determining, according to the attack rules and the domain name resolution information, whether the webpage browsing request encounters a network attack is described by using a specific example of the attack rules.

In an example of the attack rules, it is assumed that one attack rule is "m.baidu.com|1|61.135.185.17", another attack rule is "m.baidu.com|0|61.135.185.18", "0" is an illegal identifier, "1" is a legal identifier, and a to-be-accessed webpage in the webpage browsing request belongs to a Baidu website. After the domain name resolution information returned by the network according to the webpage browsing request is obtained, a target attack rule in the attack rules is obtained, where the target attack rule is an attack rule that includes the domain name "m.baidu.com". In this case, "m.baidu.com|1|61.135.185.17" and "m.baidu.com|0|61.135.185.18" both are target attack rules. Then, whether the IP address included in the domain name resolution information is included in the target attack rules is determined. If no target attack rule includes the IP address included in the domain name resolution information, it is determined that the IP address included in the domain name resolution information is legal, and the webpage browsing request encounters no network attack. If the IP address included in the domain name resolution information is "61.135.185.17", because a rule type identifier, in a target attack rule, corresponding to the IP address is a legal identifier, it is determined that the IP address included in the domain name resolution information is legal, and the webpage browsing request encounters no network attack. If the IP address included in the domain name resolution information is "61.135.185.18", because a rule type identifier, in a target attack rule, corresponding to the IP address is an illegal identifier, it is determined that the IP address included in the domain name resolution information is illegal, and the webpage browsing request encounters a network attack.

In addition, the browser client terminal usually receives multiple attack rules. One domain name may correspond to multiple attack rules. In this case, attack rules corresponding to a same domain name may be set to a form of "domain name|rule type 1|IP address 1|rule type 2|IP address 2 . . . |rule type n|IP address n". For example, an attack rule "m.baidu.com|1|61.135.185.17|0|115.239.210.14" indicates that if the to-be-accessed domain name in the webpage browsing request is "m.baidu.com", an IP address "61.135.185.17" obtained through resolution is legal, and an IP address "115.239.210.14" obtained through resolution is illegal.

In addition, attack rules of different domain names may be set together, and separated by using a separator, for example, may be set to "domain name 1|rule type 1|IP address 1^^domain name 2|rule type 2|IP address 2 . . . ^^domain name n|rule type n|IP address n", where "^^" is a separator that separates attack rules of different domain names. Certainly, other forms of separator may be used, which is not limited in this application. In this case, an attack rule "m.baidu.com|1|61.135.185.17|0|115.239.210.14^^m.sogou.com|0|202.91.232.39" indicates that if the to-be-accessed domain name in the webpage browsing request is "m.baidu.com", if the IP address included in the domain name resolution information is "61.135.185.17", the IP address is legal, and the webpage browsing request encounters no network attack. If the IP address included in the domain name resolution information is "115.239.210.14", the IP address is illegal, and the webpage browsing request encounters a network attack. Correspondingly, if the to-be-accessed domain name in the webpage browsing request is "m.sogou.com", and the IP address included in the domain name resolution information is "202.91.232.39", the IP address is illegal, and the webpage browsing request encounters a network attack.

In addition, if the target attack rule in the attack rules cannot be obtained by using the webpage browsing request, that is, there is no target attack rule in the attack rule, in this case, it is usually considered that the IP address included in the domain name resolution information is legal, and the webpage browsing request encounters no network attack.

Figure 4:
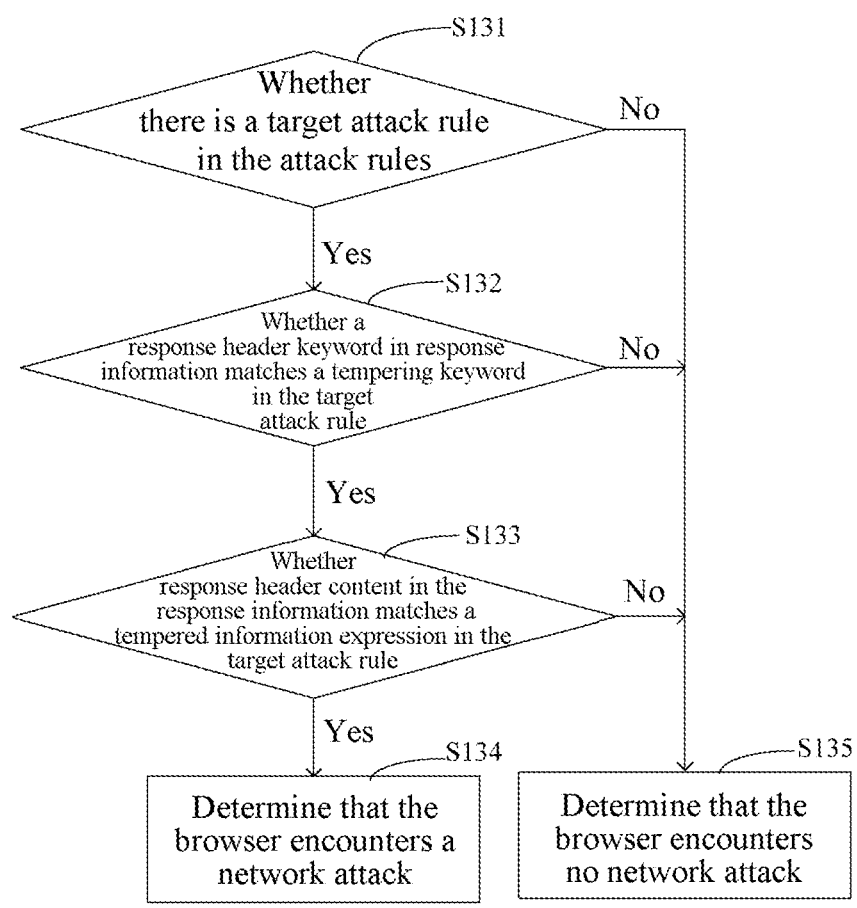
FIG. 4 is a schematic flowchart of determining whether a webpage browsing request encounters a network attack in a network attack determination method according to an exemplary embodiment.

The foregoing content describes the determining, by checking the domain name resolution information, whether a network attack is encountered. In addition, as shown in FIG. 4, when whether a network attack is encountered is determined by using the response information, the comparing obtained attack rules with the feedback information, to determine, according to a comparison result, whether the webpage browsing request encounters a network attack includes:

Step S131: Determine, by using the webpage browsing request, whether there is a target attack rule in the attack rules. If yes, execute the operation of step S132. If not, execute the operation of step S135. The attack rules include a tempering keyword, a non-tempered information expression, and a tempered information expression, and the non-tempered information expression included in the target attack rule corresponds to the webpage browsing request.

step S132: If determining that there is a target attack rule in the attack rules, after obtaining the target attack rule, traverse the target attack rule, to determine whether a response header keyword in the response information matches a tempering keyword in the target attack rule. If yes, execute the operation of step S133. If not, execute the operation of step S135.

The response information includes a response header and a response body, and the response header includes the response header keyword and response header content.

In addition, according to different network attack types, there are different tempering keywords. For example, if the current network attack is redirecting a website address corresponding to the webpage browsing request to another website address, resulting in that the browser client terminal browses the redirected website address, in this case, the tempering keyword is usually a field such as "location". The field such as "location" may indicate that when a type of the network attack is website address redirection, the webpage browsing request is redirected to a new network address. Generally, if the response header keyword includes the tempering keyword, it is considered that the response header keyword in the response information matches the tempering keyword in the target attack rule.

Step S133: If the response header keyword in the response information matches the tempering keyword in the target attack rule, determine whether response header content in the response information matches a tempered information expression in the target attack rule. If yes, execute the operation of step S134. If not, execute the operation of step S135.

Step S134: If the response header content matches the tempered information expression in the target attack rule, determine that the webpage browsing request encounters a network attack.

The tempered information expression is different from the non-tempered information expression.

Step S135: Determine that the webpage browsing request encounters no network attack.

By the operations of step S131 to step S135, whether the webpage browsing request encounters a network attack can be determined according to the attack rules and the response information. It can be known according to the foregoing operations that, the attack rules include a tempering keyword, a non-tempered information expression, and a tempered information expression, if in an attack rule, a non-tempered information expression corresponds to the webpage browsing request, a tempering keyword matches the response header keyword in the response information, and the tempered information expression matches the response header content in the response information, it indicates that the current webpage browsing request encounters a network attack.

According to different network attack types, there are also multiple types of information expressions. For example, the information expression is a URL address expression, a channel number expression, or a media type expression, or the information expression may be of other types, which is not limited in this application.

If the non-tempered information expression and the tempered information expression both are URL address expressions, it indicates that due to the network attack, an access address in the webpage browsing request is redirected to another URL address. If the non-tempered information expression and the tempered information expression both are channel number expressions, it indicates that due to the network attack, a channel number in the webpage browsing request is tempered. If the non-tempered information expression and the tempered information expression both are media type expressions, it indicates that due to the network attack, a media type expression in the webpage browsing request is tempered.

For example, if the webpage browsing request indicates that a current to-be-accessed webpage is a page of a Baidu website, the non-tempered information expression included in the target attack rule includes a URL address of the Baidu website. If the response header keyword in the webpage response information includes a redirection keyword, and a URL address included in the response header content is a URL address of another webpage, and matches a tempered URL address included in the target attack rule, it may be determined that the webpage browsing request encounters a network attack, the webpage browsing request is redirected to the another webpage, and the browser cannot access the Baidu website.

In the following description, the workflow of determining, according to the attack rules and the response information, whether the webpage browsing request encounters a network attack is described by using a specific example of the attack rule.

In an example of the attack rule, it is assumed that the attack rule is "rescode|301|location|.*m.baidu.com.*from=1009- 719a|location|.*m.sogou.com.*", where "rescode", "301", and "location" are tempering keywords, ".*m.baidu.com.*from=1009719a" is a non-tempered information expression, ".*m.sogou.com.*" is a tempered information expression, the information expressions are URL addresses, and are separated by "|", where "rescode" is an abbreviation of "responsecode", and represents code returned by a server according to the webpage browsing request, "301" and "location" indicate redirection, ".*m.baidu.com.*from=1009719a" indicates that before the network attack, the browser client terminal intends to access a Baidu website, and ".*m.sogou.com.*" indicates that due to the network attack, the browser client terminal is redirected to access a Sogou website.

Figure 5:
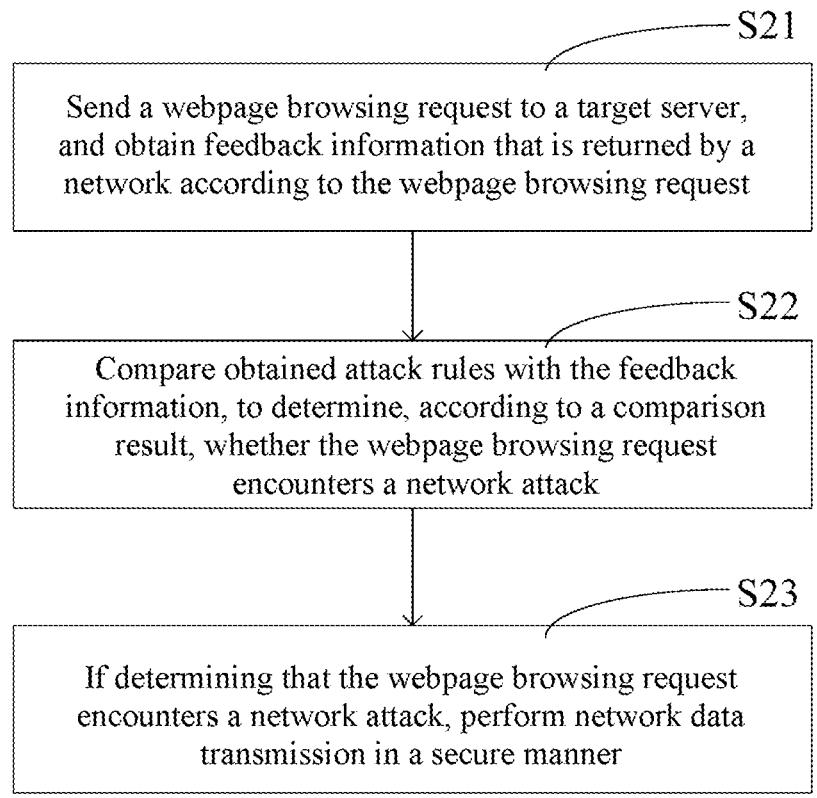
FIG. 5 is a schematic flowchart of a secure network data transmission method according to an exemplary embodiment.

In addition, in a second embodiment of this application, a secure network data transmission method is disclosed, where the method is applied to a browser client terminal. Referring to a schematic flowchart shown in FIG. 5, the secure network data transmission method includes:

Step S21: Obtain feedback information that is returned by a network according to a webpage browsing request.

When a user needs to access a browser, the user operates the browser, for example, touches the browser. After receiving the operation, the browser generates a corresponding webpage browsing request, and a network returns corresponding feedback information according to the webpage browsing request. The feedback usually encounters a network attack during network transmission, resulting in that the browser client terminal cannot obtain correct feedback information. The network attack may occur in different nodes in the network, and the feedback information may be but not limited to: domain name resolution information and response information that is returned by the network according to the webpage browsing request. For example, if the user needs to browse a webpage, the browser client terminal generates a webpage browsing request according to a webpage browsing request operation of the user. Before the webpage browsing request is transmitted to a webpage server, domain name resolution information of the webpage browsing request needs to be obtained from a domain name resolution server. The response information may be returned by a target server. For example, if the user needs to browse a webpage, the browser client terminal generates a webpage browsing request, and transmits the webpage browsing request to the target server. During transmission, the network returns response information corresponding to the webpage browsing request.

Step S22: Compare obtained attack rules with the domain name resolution information, to determine, according to a comparison result, whether the webpage browsing request encounters a network attack, where the attack rules are sent by a rule configuration server.

When whether a network attack is encountered is determined by checking the domain name resolution information, during the comparing obtained attack rules with the feedback information, to determine, according to a comparison result, whether the webpage browsing request encounters a network attack, legality of an IP address included in the domain name resolution information may be first determined according to the method in step S121 to step S125, and then whether the webpage browsing request encounters a network attack is determined according to the legality of the IP address. Details are not described herein again. In addition, when whether a network attack is encountered is determined by checking the response information, for the method for comparing obtained attack rules with the feedback information, to determine, according to a comparison result, whether the webpage browsing request encounters a network attack, refer to step S131 to step S135. Details are not described herein again.

Step S23: If determining that the webpage browsing request encounters a network attack, perform network data transmission in a secure manner.

Step S21 to step S23 above disclose a secure network data transmission method. In the method, after obtaining feedback information that is returned by a network according to a webpage browsing request, a browser client terminal compares obtained attack rules with the feedback information, to determine, according to a comparison result, whether the webpage browsing request encounters a network attack, and after determining, according to the comparison result, that the webpage browsing request encounters a network attack, performs network data transmission in a secure manner; or if determining, according to the comparison result, that the webpage browsing request encounters no network attack, performs network data transmission according to a conventional technology. As the network data transmission is performed in the secure manner, impact from the network attack can be avoided, a problem in the prior art that due to the network attack, the webpage browsing request is tempered is resolved, and security hazards can be reduced.

For example, after obtaining the domain name resolution information that is returned by the network according to the webpage browsing request, the browser client terminal compares the obtained attack rules with the domain name resolution information, to determine, according to a comparison result, whether the webpage browsing request encounters a network attack, and after determining, according to the comparison result, that the webpage browsing request encounters a network attack, performs network data transmission in a secure manner; or if determining, according to the comparison result, that the webpage browsing request encounters no network attack, obtains a to-be-accessed IP address according to the domain name resolution information, accesses a target server corresponding to the IP address, and performs network data transmission. As the network data transmission is performed in the secure manner, impact from the network attack can be avoided, a problem in the prior art that due to the network attack, the browser client terminal cannot obtain a correct IP address, resulting in that the browser client terminal cannot obtain required webpage data, and a user cannot browse required information is resolved, and the browser client terminal can display webpage data corresponding to the webpage browsing request, satisfying a browsing requirement of the user.

Further, the performing network data transmission in a secure manner in step S23 includes the following steps:

firstly, after encrypting the webpage browsing request, sending, by the browser client terminal, an encrypted webpage browsing request to a proxy server, so that the proxy server decrypts the encrypted webpage browsing request, performs domain name resolution on a decrypted webpage browsing request, accesses a target server corresponding to a domain name resolution result, to obtain network data corresponding to the decrypted webpage browsing request, and encrypts the network data; and then, receiving encrypted network data returned by the proxy server.

A private protocol is preset between the browser client terminal and the proxy server, that is, a preset protocol, and encryption and decryption methods between the browser client terminal and the proxy server can be specified by using the preset protocol. The browser client terminal encrypts the webpage browsing request according to the preset protocol between the browser client terminal and the network proxy server, and transmits an encrypted webpage browsing request to the proxy server. After obtaining the encrypted webpage browsing request, the proxy server decrypts the encrypted webpage browsing request according to the preset protocol, after obtaining a decrypted webpage browsing request, performs domain name resolution on the decrypted webpage browsing request, and accesses a target server corresponding to a domain name resolution result. After obtaining network data, the proxy server encrypts the network data according to the preset protocol, and transmits encrypted network data to the browser client terminal. After receiving the encrypted network data, the browser client terminal decrypts the encrypted network data according to the preset protocol, and displays decrypted network data for browsing by the user.

As data transmitted between the browser client terminal and the proxy server is encrypted, impact from the network attack is avoided, and the browser client terminal can obtain correct webpage data.

In addition, after receiving an attack rule transmitted by the rule configuration server, the browser client terminal may further perform format analysis on the received attack rule, and after the format analysis, if determining that the received attack rule does not conform to a preset format, discard the attack rule that does not conform to the preset format.

For example, if a form of each attack rule is set to "domain name|rule type|IP address", the browser client terminal determines whether the attack rule transmitted by the rule configuration server conforms to the preset format, and if yes, stores the attack rule; or if not, discards the attack rule, to save storage space. In addition, in an implementation manner, the format of each attack rule may be set to a form of "key 1|rule 1|key 2|rule 2|key n|rule n", where n is a natural number. If an attack rule is: "rescode|301|location|.*m.baidu.com.*from=1009719a|location|.*m.sogou.com.*", the attack rule indicates that a webpage browsing request for accessing "baidu.com" is redirected to a target address "sogou.com". In the attack rule, key 1 is rescode, rule 1 is 301, key 2 is location, rule 2 is ".*m.baidu.com.*from=1009719a", key 3 is location, rule 3 is ".*m.so.com.*", and they are separated by "|", and it is considered that the attack rule conforms to the format.

In this case, after receiving the attack rule transmitted by the rule configuration server, the browser client terminal determines whether the attack rule conforms to the form "key 1|rule 1|key 2|rule 2|key n|rule n", and if yes, stores the attack rule, or if not, discards the attack rule, to save storage space. Certainly, in other implementation manners, the attack rule may be set to other multiple forms, such as "key 1:rule 1; key 2:rule 2; key n:rule n", which is not limited in this application.

Further, the secure network data transmission method disclosed in this application further includes: after determining that the webpage browsing request encounters a network attack, discarding the domain name resolution information.

If the webpage browsing request encounters a network attack, the domain name resolution information received by the browser client terminal is affected by the network attack. For example, the domain name resolution information is domain name resolution information returned by the network according to the webpage browsing request, and an IP address included in the domain name resolution information is usually erroneous. Therefore, the domain name resolution information is discarded, to save storage space.

Advantages of this application are described below by using multiple specific examples:

In the prior art, when needing to browse a Baidu website, the browser client terminal sometimes encounters a network attack, and receives erroneous domain name resolution information, where an IP address included in the erroneous domain name resolution information is an IP address of a 360 website. For example, DNS hijacking occurs on a network node between the browser client terminal and a domain name resolution server, where an IP address corresponding to a domain name "m.baidu.com" resolved by a domain name resolution server is modified to an IP address of a 360 website. In this case, the browser client terminal accesses the 360 website. In the secure network data transmission method disclosed in this application, it is determined, according to an attack rule, that a webpage browsing request encounters a network attack, and network data transmission is performed in a secure manner, so that the browser client terminal can access a correct Baidu website.

Figure 6:
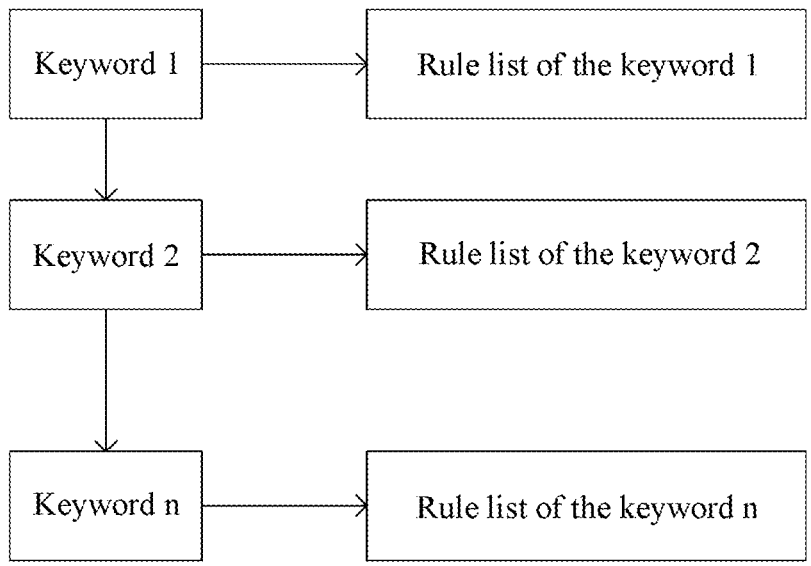
FIG. 6 is a schematic structural diagram of an attack rule in a secure network data transmission method according to an exemplary embodiment.

In addition, for ease of comparison, after receiving the attack rules, the browser client terminal may analyze the attack rules, so that each attack rule has a data structure shown in FIG. 6, where the data structure is a two-dimensional data structure. In the two-dimensional data structure, each domain name is used as an index, to indicate a rule list of the domain name. To cope with multiple types of attack rules, the rule configuration server configures multiple attack rules according to access requirements of a browser. For example, when accessing a Baidu website, the browser may encounter a network attack that causes the browser to skip to a 360 website or another advertisement website; when accessing a shopping website, the browser may encounter a network attack that causes the browser to skip to another shopping website.

The rule configuration server configures multiple attack rules accordingly. After receiving the attack rules, the browser client terminal may analyze the attack rules according to domain names included in the attack rules, to obtain a two-dimensional data structure shown in FIG. 6.

The network attack prevention method disclosed in this application can be applied to multiple application scenarios, to prevent multiple types of network attacks.

In an application scenario, a network attack causes a target address in a webpage browsing request to be tempered, resulting in that the webpage browsing request is redirected to an illegal target address. In the prior art, the browser client terminal can access only the redirected illegal target address. However, in this application, the browser client terminal can identify the network attack, and obtain required webpage data by using the proxy server. For example, if the network attack redirects a webpage browsing request for accessing a Baidu website to a 360 website, in this case, a response header in response information includes redirection fields such as "301" or "302", and "location", and includes a URL address of the 360 website. After receiving the response information returned by the network, the browser client terminal searches attack rules for a target attack rule according to a to-be-accessed target address and a URL address of the Baidu website that are included in the webpage browsing request, where a non-tempered URL address expression included in the target attack rule corresponds to the URL address of the Baidu website included in the webpage browsing request; and traverses the target attack rule, to determine whether a response header keyword in the webpage response information matches a tempering keyword in the target attack rule, where the tempering keyword is the redirection fields such as "301" or "302", and "location". If the response header keyword in the response information matches the tempering keyword in the target attack rule, the browser client terminal continues to determine whether response header content matches a tempered information expression in the target attack rule, where the tempered information expression is a redirected website address, and in this example, the tempered information expression is the URL address of the 360 website. If the response header content matches the tempered information expression in the target attack rule, the browser client terminal determines that the webpage browsing request encounters a network attack, the webpage browsing request is tempered and redirected to the 360 website, and required webpage data needs to be obtained by using a secure proxy server, avoiding impact from the network attack.

In another application scenario, some illegal operators redirect normal webpage browsing requests to their advertisement pages. In the prior art, the browser can access only advertisements of the operators. However, in this application, the browser client terminal can identify such situations, and obtain required webpage data. For example, an operator launches a network attack, and causes a normal webpage browsing request of a user to skip to an advertisement page, and the advertisement page is loaded slowly, leading to a white screen for ten-odd seconds. In this case, if a non-tempered URL address expression included in one or more attack rules is a target address corresponding to the webpage browsing request, a response header keyword corresponds to a tempering keyword in a target attack rule, and include redirection fields "301" or "302", and "location", and response header content matches a tempered information expression in the target attack rule, and corresponds to a URL address of the advertisement page, it is determined that the webpage browsing request is redirected to the advertisement page, and encounters a network attack, and required webpage data needs to be obtained by using a secure proxy server, so that the browser client terminal displays normal webpage data, and white screens are reduced.

In another application scenario, some illegal commercial tenants temper, at some network nodes, channel numbers included in webpage browsing requests, to gain profits. In the prior art, the browser client terminal can do nothing but let the channel numbers be tempered. However, in this application, the browser client terminal can identify such situations. For example, a commercial tenant changes a channel number "from=2001c" for accessing a Baidu website by the browser client terminal to a channel number of the commercial tenant. In this case, if a non-tempered channel number included in an attack rule is the same as a channel number included in a webpage browsing request, it is determined that the attack rule is a target attack rule. If a keyword in response information matches a tempering keyword in the target attack rule, and response header content matches a tempered channel number expression in the target attack rule, it is determined that the current webpage browsing request encounters a network attack, and required webpage data needs to be obtained by using a secure proxy server, avoiding impact from the network attack.

Figure 7:
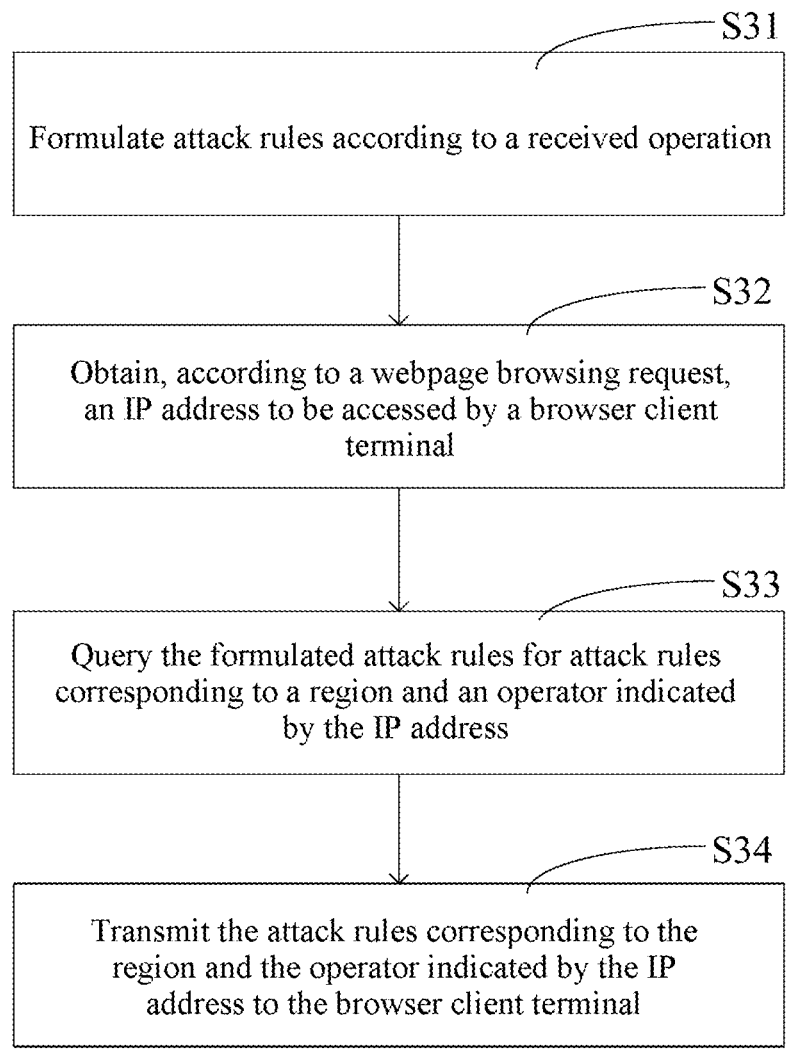
FIG. 7 is a schematic flowchart of a secure network data transmission method according to an exemplary embodiment.

In a third embodiment of this application, a secure network data transmission method is disclosed, where the method is applied to a rule configuration server. Referring to a schematic flowchart shown in FIG. 7, the secure network data transmission method includes the following steps:

Step S31: Formulate attack rules according to a received operation.

Step S32: Obtain a webpage browsing request transmitted by a browser client terminal, and obtain, according to the webpage browsing request, an IP address to be accessed by the browser client terminal.

There is no strict order between step S31 and step S32. They may be performed simultaneously, or the operation of step S32 is executed first, and then the operation of step S31 is executed.

Step S33: Query the formulated attack rules for attack rules corresponding to a region and an operator indicated by the IP address.

When a same domain name is accessed, IP addresses corresponding to different regions and operators are usually different.

In this case, the rule configuration server needs to obtain, according to the webpage browsing request, an IP address to be accessed by the browser client terminal, and after formulating the attack rules, the rule configuration server queries the attack rules for attack rules corresponding to a region and an operator indicated by the IP address.

Step S34: Transmit the attack rules corresponding to the region and the operator indicated by the IP address to the browser client terminal, so that the browser client terminal determines, according to the attack rules, whether a network attack is encountered.

In a method of determining, by the browser client terminal according to the attack rules, whether a network attack is encountered, legality of an IP address included in domain name resolution information may be first determined according to the method of step S121 to step S125, and then whether the webpage browsing request encounters a network attack is determined according to the legality of the IP address. Details are not described herein again.

By the operations of step S31 to step S34, a rule configuration server can formulate attack rules, obtain attack rules corresponding to a region and an operator indicated by an IP address to be accessed by a browser client terminal, and transmit the attack rules corresponding to the region and the operator indicated by the IP address to the browser client terminal. In addition, the browser client terminal determines, according to the received attack rules, whether a network attack is encountered, and when determining that a network attack is encountered, the browser client terminal performs network data transmission in a secure manner, avoiding impact from the network attack.

Figure 8:
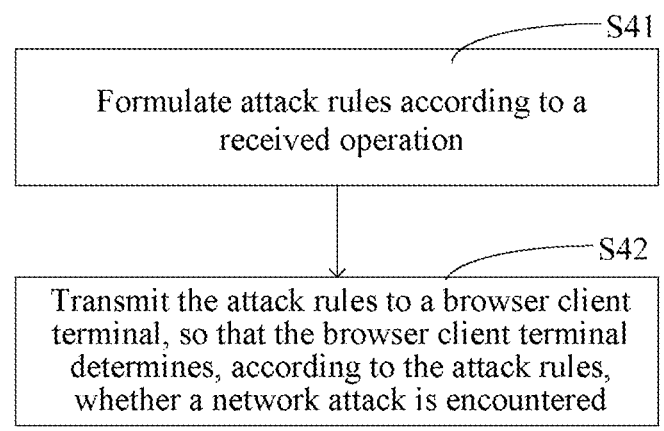
FIG. 8 is a schematic flowchart of a secure network data transmission method according to an exemplary embodiment.

In a fourth embodiment of this application, a secure network data transmission method is disclosed, where the method is applied to a rule configuration server. Referring to a schematic flowchart shown in FIG. 8, the secure network data transmission method includes the following steps:

Step S41: Formulate attack rules according to a received operation.

In the method, various types of network attacks are collected and analyzed in advance, to formulate attack rules corresponding to the network attacks.

Step S42: Transmit the attack rules to a browser client terminal, so that the browser client terminal determines, according to the attack rules, whether a network attack is encountered.

For a method of determining, by the browser client terminal according to the attack rules, whether a network attack is encountered, refer to step S131 to step S135. Details are not described herein again.

By the operations of step S41 and step S42, a rule configuration server can formulate attack rules corresponding to various types of network attacks, and transmit the attack rules to a browser client terminal, so that the browser client terminal determines, according to the received attack rules, whether a network attack is encountered, and when determining that a network attack is encountered, the browser client terminal performs network data transmission in a secure manner, avoiding impact from the network attack.

Figure 9:
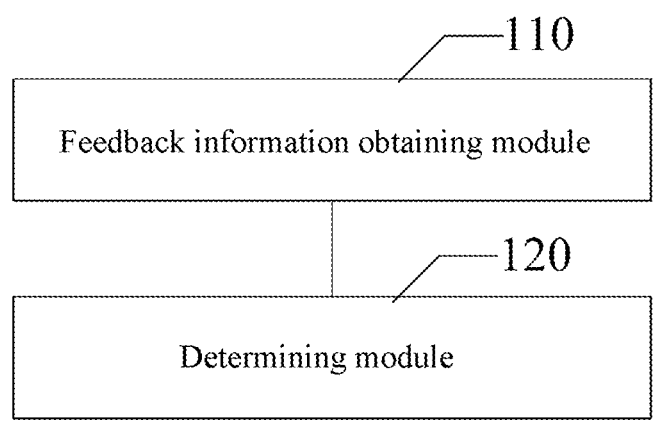
FIG. 9 is a schematic structural diagram of a network attack determining apparatus according to an exemplary embodiment.

Correspondingly, in a fifth embodiment of this application, a network attack determining apparatus is provided, where the network attack determining apparatus is applied to a browser client terminal. Referring to a schematic structural diagram shown in FIG. 9, the network attack determining apparatus includes: a feedback information obtaining module 110 and a determining module 120.

The feedback information obtaining module 110 is configured to obtain feedback information that is returned by a network according to a webpage browsing request.

The determining module 120 is configured to compare obtained attack rules with the feedback information, to determine, according to a comparison result, whether the webpage browsing request encounters a network attack, where the attack rules are sent by a rule configuration server.

The feedback information is response information that is returned by the network according to the webpage browsing request.

In an implementation manner, the determining module 120 may include: an obtaining unit, a first determining unit, a second determining unit, and a third determining unit.

The obtaining unit is configured to obtain a target attack rule in the attack rules by using the webpage browsing request, where the attack rules include a tempering keyword, a non-tempered information expression, and a tempered information expression, and the non-tempered information expression included in the target attack rule corresponds to the webpage browsing request.

The first determining unit is configured to traverse the target attack rule, to determine whether a response header keyword in the response information matches a tempering keyword in the target attack rule.

The second determining unit is configured to: if the response header keyword in the response information matches the tempering keyword in the target attack rule, determine whether response header content in the response information matches a tempered information expression in the target attack rule.

The third determining unit is configured to: if the response header content matches the tempered information expression in the target attack rule, determine that the webpage browsing request encounters a network attack.

Further, the information expression is a URL address expression, a channel number expression, or a media type expression.

In this embodiment, the network attack determining apparatus obtains attack rules formulated by a rule configuration server, and after obtaining feedback information that is returned by a network according to a webpage browsing request, determines, according to a comparison result between the attack rules and the feedback information, whether the webpage browsing request encounters a network attack, thereby resolving a problem in the prior art that a network attack cannot be identified.

Figure 10:
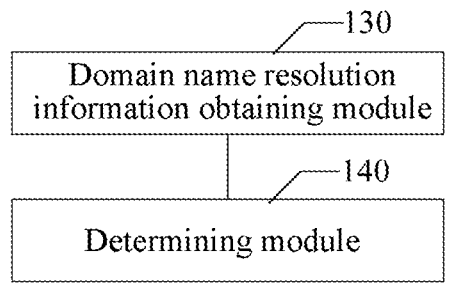
FIG. 10 is a schematic structural diagram of a network attack determining apparatus according to an exemplary embodiment.

Correspondingly, in a sixth embodiment of this application, a network attack determining apparatus is provided, where the network attack determining apparatus is applied to a browser client terminal. Referring to a schematic structural diagram shown in FIG. 10, the network attack determining apparatus includes: a domain name resolution information obtaining module 130 and a determining module 140.

The domain name resolution information obtaining module 130 is configured to obtain domain name resolution information that is returned by a network according to a webpage browsing request.

The determining module 140 is configured to compare obtained attack rules with the domain name resolution information, to determine, according to a comparison result, whether the webpage browsing request encounters a network attack, where the attack rules are sent by a rule configuration server.

Further, the determining module 140 includes: an IP address legality determining unit and a network attack determining unit.

The IP address legality determining unit is configured to determine, according to the attack rules and the domain name resolution information, legality of an IP address included in the domain name resolution information.

The network attack determining unit is configured to determine, according to the legality of the IP address included in the domain name resolution information, whether the webpage browsing request encounters a network attack, and if the IP address is legal, determine that the webpage browsing request encounters no network attack, or if the IP address is illegal, determine that the webpage browsing request encounters a network attack.

Further, the IP address legality determining unit includes: a target attack rule obtaining subunit, a target attack rule traversing subunit, a first determining subunit, and a second determining subunit.

The target attack rule obtaining subunit is configured to obtain a target attack rule in the attack rules by using the webpage browsing request, where the attack rules include a domain name, an IP address, and a rule type identifier, and a domain name included in the target attack rule is the same as a to-be-accessed domain name in the webpage browsing request.

The target attack rule traversing subunit is configured to traverse the target attack rule, to determine whether the IP address included in the domain name resolution information is included in the target attack rule.

The first determining subunit is configured to: if the IP address included in the domain name resolution information is not included in the target attack rule, determine that the IP address included in the domain name resolution information is legal.

The second determining subunit is configured to: if the IP address included in the domain name resolution information is included in the target attack rule, determine, according to the target attack rule, whether the IP address included in the domain name resolution information is legal, and if a rule type identifier, in the target attack rule, corresponding to the IP address included in the domain name resolution information is a legal identifier, determine that the IP address is legal, or if a rule type identifier, in the target attack rule, corresponding to the IP address included in the domain name resolution information is an illegal identifier, determine that the IP address is illegal.

In this embodiment, the network attack determining apparatus obtains attack rules formulated by a rule configuration server, and after obtaining domain name resolution information that is returned by a network according to a webpage browsing request, determines, according to a comparison result between the attack rules and the domain name resolution information, whether the webpage browsing request encounters a network attack, thereby resolving a problem in the prior art that a network attack cannot be identified.

Figure 11:
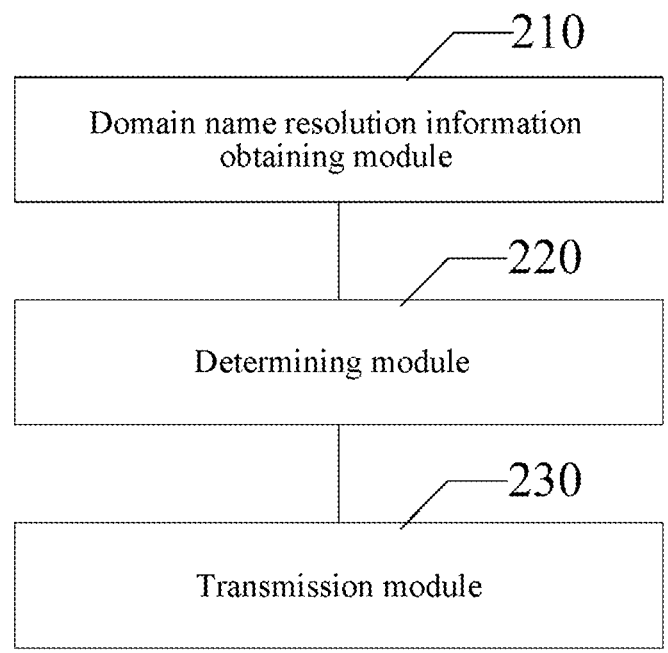
FIG. 11 is a schematic structural diagram of a secure network data transmission apparatus according to an exemplary embodiment.

Correspondingly, in a seventh embodiment of this application, a secure network data transmission apparatus is disclosed, which can be applied to a browser client terminal. Referring to a schematic structural diagram shown in FIG. 11, the secure network data transmission apparatus includes: a domain name resolution information obtaining module 210, a determining module 220, and a transmission module 230.

The domain name resolution information obtaining module 210 is configured to obtain domain name resolution information that is returned by a network according to a webpage browsing request.

The determining module 220 is configured to compare obtained attack rules with the domain name resolution information, to determine, according to a comparison result, whether the webpage browsing request encounters a network attack, where the attack rules are sent by a rule configuration server.

The transmission module 230 is configured to: if it is determined that the webpage browsing request encounters a network attack, perform network data transmission in a secure manner.

Further, the determining module 220 includes: an IP address legality determining unit and a network attack determining unit.

The IP address legality determining unit is configured to determine, according to the attack rules and the domain name resolution information, legality of an IP address included in the domain name resolution information.

The network attack determining unit is configured to determine, according to the legality of the IP address included in the domain name resolution information, whether the webpage browsing request encounters a network attack, and if the IP address is legal, determine that the webpage browsing request encounters no network attack, or if the IP address is illegal, determine that the webpage browsing request encounters a network attack.

Further, the IP address legality determining unit includes: a target attack rule obtaining subunit, a target attack rule traversing subunit, a first determining subunit, and a second determining subunit.

The target attack rule obtaining subunit is configured to obtain a target attack rule in the attack rules by using the webpage browsing request, where the attack rules include a domain name, an IP address, and a rule type identifier, and a domain name included in the target attack rule is the same as a to-be-accessed domain name in the webpage browsing request.

The target attack rule traversing subunit is configured to traverse the target attack rule, to determine whether the IP address included in the domain name resolution information is included in the target attack rule.

The first determining subunit is configured to: if the IP address included in the domain name resolution information is not included in the target attack rule, determine that the IP address included in the domain name resolution information is legal.

The second determining subunit is configured to: if the IP address included in the domain name resolution information is included in the target attack rule, determine, according to the target attack rule, whether the IP address included in the domain name resolution information is legal, and if a rule type identifier, in the target attack rule, corresponding to the IP address included in the domain name resolution information is a legal identifier, determine that the IP address is legal, or if a rule type identifier, in the target attack rule, corresponding to the IP address included in the domain name resolution information is an illegal identifier, determine that the IP address is illegal.

Further, the transmission module 230 includes: a sending unit and a receiving unit.

The sending unit is configured to: after the webpage browsing request is encrypted, send an encrypted webpage browsing request to a proxy server, so that the proxy server decrypts the encrypted webpage browsing request, performs domain name resolution on a decrypted webpage browsing request, accesses a target server corresponding to a domain name resolution result, to obtain network data corresponding to the decrypted webpage browsing request, and encrypts the network data.

The receiving unit is configured to receive encrypted network data returned by the proxy server.

Further, the secure network data transmission apparatus further includes: a discarding module, configured to: after it is determined that the webpage browsing request encounters a network attack, discard the domain name resolution information.

In this embodiment, the secure network data transmission apparatus obtains attack rules formulated by a rule configuration server, after obtaining domain name resolution information returned by a network according to a webpage browsing request, determines, according to a comparison result between the attack rules and the domain name resolution information, whether the webpage browsing request encounters a network attack, and after determining, according to the comparison result, that the webpage browsing request encounters a network attack, performs network data transmission in a secure manner; or if determining, according to the comparison result, that the webpage browsing request encounters no network attack, performs network data transmission according to a conventional technology. As the network data transmission is performed in the secure manner, impact from the network attack can be avoided, a problem in the prior art that due to the network attack, a correct IP address cannot be obtained, resulting in that a browser client terminal cannot obtain required webpage data, and a user cannot browse required information is resolved, and the browser client terminal can display webpage data corresponding to the webpage browsing request, satisfying a browsing requirement of the user.

Figure 12:
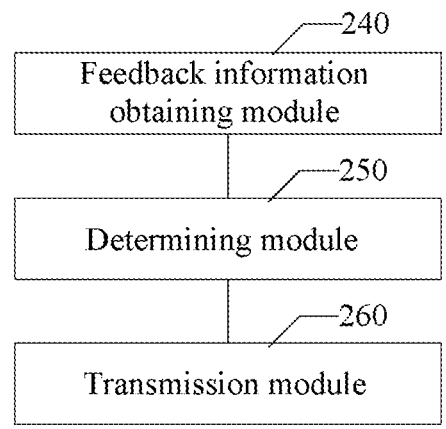
FIG. 12 is a schematic structural diagram of a secure network data transmission apparatus according to an exemplary embodiment.

Correspondingly, in an eighth embodiment of this application, a secure network data transmission apparatus is disclosed, applied to a browser client terminal. Referring to a schematic structural diagram shown in FIG. 12, the secure network data transmission apparatus includes: a feedback information obtaining module 240, a determining module 250, and a transmission module 260.

The feedback information obtaining module 240 is configured to: after a webpage browsing request is sent to a target server, obtain feedback information that is returned by a network according to the webpage browsing request.

The determining module 250 is configured to compare obtained attack rules with the feedback information, to determine, according to a comparison result, whether the webpage browsing request encounters a network attack, where the attack rules are sent by a rule configuration server.

The transmission module 260 is configured to: if it is determined that the webpage browsing request encounters a network attack, perform network data transmission in a secure manner.

The feedback information is usually response information that is returned by the network according to the webpage browsing request.

Further, the determining module 220 includes: an obtaining unit, a first determining unit, a second determining unit, and a third determining unit.

The obtaining unit is configured to obtain a target attack rule in the attack rules by using the webpage browsing request, where the attack rules include a tempering keyword, a non-tempered information expression, and a tempered information expression, and the non-tempered information expression included in the target attack rule corresponds to the webpage browsing request.

The first determining unit is configured to traverse the target attack rule, to determine whether a response header keyword in the response information matches a tempering keyword in the target attack rule.

The second determining unit is configured to: if the response header keyword in the response information matches the tempering keyword in the target attack rule, determine whether response header content in the response information matches a tempered information expression in the target attack rule.

The third determining unit is configured to: if the response header content matches the tempered information expression in the target attack rule, determine that the webpage browsing request encounters a network attack.

Further, the transmission module 260 includes: a sending unit and a receiving unit.

The sending unit is configured to: after the webpage browsing request is encrypted, send an encrypted webpage browsing request to a proxy server, so that after the proxy server decrypts the encrypted webpage browsing request, the proxy server obtains, from the target server, network data corresponding to the webpage browsing request, and encrypts the network data.

The receiving unit is configured to receive encrypted network data returned by the proxy server.

Further, the secure network data transmission apparatus further includes: a discarding module, configured to: after it is determined that the webpage browsing request encounters a network attack, discard the feedback information.

In this embodiment, the secure network data transmission apparatus obtains attack rules formulated by a rule configuration server, after obtaining feedback information returned by a network according to a webpage browsing request, determines, according to a comparison result between the attack rules and the feedback information, whether the webpage browsing request encounters a network attack, and after determining, according to the comparison result, that the webpage browsing request encounters a network attack, performs network data transmission in a secure manner; or if determining, according to the comparison result, that the webpage browsing request encounters no network attack, performs network data transmission according to a conventional technology. As the network data transmission is performed in the secure manner, impact from the network attack can be avoided, a problem in the prior art that due to the network attack, the webpage browsing request is tempered is resolved, and security hazards can be avoided.

Figure 13:
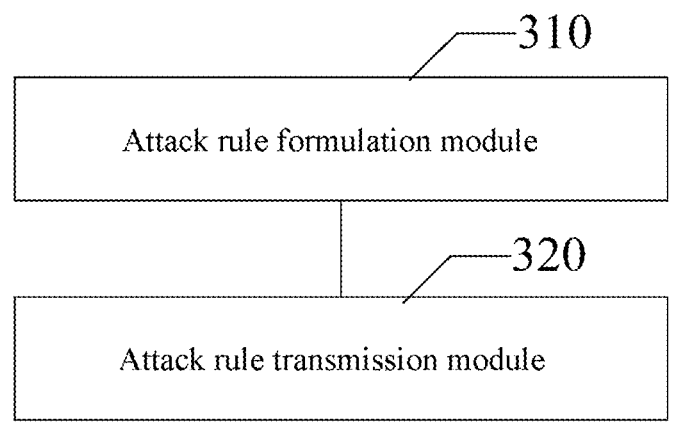
FIG. 13 is a schematic structural diagram of a secure network data transmission apparatus according to an exemplary embodiment.

Correspondingly, a ninth embodiment of this application discloses a secure network data transmission apparatus, where the secure network data transmission apparatus is applied to a rule configuration server. Referring to a schematic structural diagram shown in FIG. 13, the secure network data transmission apparatus includes: an attack rule formulation module 310 and an attack rule transmission module 320.

The attack rule formulation module 310 is configured to formulate attack rules according to a received operation.

The attack rule transmission module 320 is configured to transmit the attack rules to a browser client terminal, so that the browser client terminal determines, according to the attack rules, whether a network attack is encountered.

The secure network data transmission apparatus can formulate attack rules corresponding to various types of network attacks, and transmit the attack rules to a browser client terminal, so that the browser client terminal determines, according to the received attack rules, whether a network attack is encountered, and when determining that a network attack is encountered, the browser client terminal performs network data transmission in a secure manner, avoiding impact from the network attack.

Figure 14:
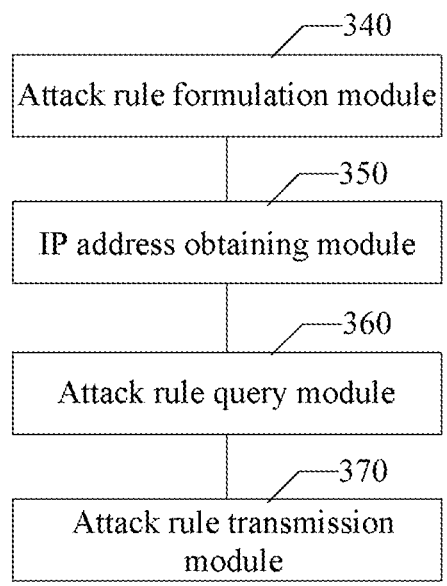
FIG. 14 is a schematic structural diagram of a secure network data transmission apparatus according to an exemplary embodiment.
Figure 15:
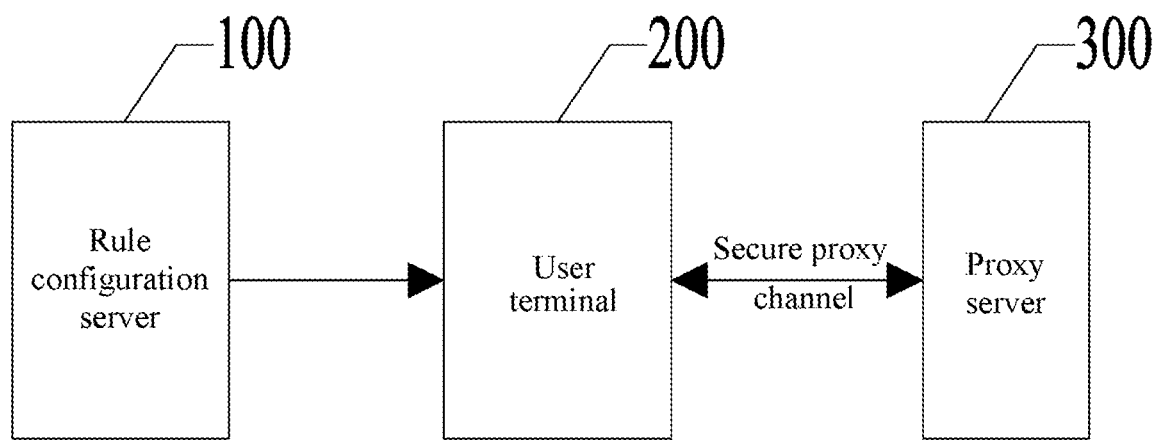
FIG. 15 is a schematic structural diagram of a secure network data transmission system according to an exemplary embodiment.

Correspondingly, a tenth embodiment of this application discloses a secure network data transmission apparatus, where the secure network data transmission apparatus is applied to a rule configuration server. Referring to a schematic structural diagram shown in FIG. 14, the secure network data transmission apparatus includes: an attack rule formulation module 340, an IP address obtaining module 350, an attack rule query module 360, and an attack rule transmission module 370.

The attack rule formulation module 340 is configured to formulate attack rules according to a received operation.

The IP address obtaining module 350 is configured to obtain a webpage browsing request transmitted by a browser client terminal, and obtain, according to the webpage browsing request, an IP address to be accessed by the browser client terminal.

The attack rule query module 360 is configured to query the formulated attack rules for attack rules corresponding to a region and an operator indicated by the IP address.

The attack rule transmission module 370 is configured to transmit the attack rules corresponding to the region and the operator indicated by the IP address to the browser client terminal, so that the browser client terminal determines, according to the attack rules, whether a network attack is encountered.

The secure network data transmission apparatus can formulate attack rules, and can determine, according to a region and an operator, an attack rule corresponding to a to-be-accessed IP address, and transmits the attack rule corresponding to the IP address to a browser client terminal, so that the browser client terminal determines, according to the received attack rule, whether a network attack is encountered, and when determining that a network attack is encountered, the browser client terminal performs network data transmission in a secure manner, avoiding impact from the network attack.

The tenth embodiment of this application discloses a network attack prevention system. Referring to a schematic structural diagram shown in FIG. 9, the network attack prevention system includes: a rule configuration server 100, a user terminal 200, and a proxy server 300, where the user terminal 200 is provided with a browser client terminal.

The rule configuration server 100 is configured to formulate attack rules according to a received operation, and transmit the attack rules to the browser client terminal of the user terminal 200.

In an implementation manner, the rule configuration server may be configured to formulate the attack rules according to the received operation, obtain a webpage browsing request transmitted by the browser client terminal of the user terminal, and obtain, according to the webpage browsing request, an IP address to be accessed by the browser client terminal; query the formulated attack rules for attack rules corresponding to a region and an operator indicated by the IP address; and transmit the attack rules corresponding to the region and the operator indicated by the IP address to the browser client terminal.

The browser client terminal of the user terminal is configured to: after obtaining feedback information that is returned by a network according to the webpage browsing request, compare the attack rules with the feedback information, to determine, according to a comparison result, whether the webpage browsing request encounters a network attack, and if determining that the webpage browsing request encounters a network attack, perform network data transmission with the proxy server in a secure manner.

In an implementation manner, the browser client terminal of the user terminal may be configured to: obtain domain name resolution information that is returned by the network according to the webpage browsing request, compare the attack rules transmitted by the rule configuration server with the domain name resolution information, to determine, according to a comparison result, whether the webpage browsing request encounters a network attack, and if determining that the webpage browsing request encounters a network attack, perform network data transmission with the proxy server in a secure manner.

When performing the network data transmission in the secure manner, the browser client terminal of the user terminal 200 encrypts the webpage browsing request according to a preset protocol between the browser client terminal and the proxy server 300, and transmits an encrypted webpage browsing request to the proxy server 300. After receiving the encrypted webpage browsing request, the proxy server 300 decrypts the encrypted webpage browsing request according to the preset protocol, transmits a decrypted webpage browsing request to a target server, obtains, by using the target server, webpage data corresponding to the decrypted webpage browsing request, and transmits the webpage data to the browser client terminal of the user terminal 200 after encrypting the webpage data according to the preset protocol. After decrypting the webpage data according to the preset protocol, the browser client terminal displays webpage content corresponding to decrypted webpage data.

In the network attack prevention system disclosed in this embodiment, whether a webpage browsing request encounters a network attack can be determined, and after it is determined that a network attack is encountered, network data transmission between a browser client terminal and a proxy server is performed by using a secure channel, avoiding impact from the network attack. Further, security hazards brought by the network attack can be reduced.

In addition, the channel for data transmission between the browser client terminal and the proxy server may be named a secure proxy channel.

With respect to the apparatuses in the above embodiments, the specific manners for performing operations by modules therein have been described in detail in the related method embodiments, and will not be elaborated herein.

In addition, the method according to the present disclosure may be implemented as a computer program product, where the computer program product includes a computer-readable medium having non-volatile program code executable by a processor. The computer-readable medium stores a computer program configured to implement the functions defined in the method of the present disclosure. For example, the computer program may obtain feedback information that is returned by a network according to a webpage browsing request; and compare obtained attack rules with the feedback information, to determine, according to a comparison result, whether the webpage browsing request encounters a network attack, where the attack rules are sent by a rule configuration server.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A secure network data transmission method, wherein the secure network data transmission method comprises:
   determining conforming attack rules based on format analysis on attack rules transmitted by a rule configuration server;
   comparing domain name resolution information with the conforming attack rules, wherein the domain name resolution information is returned by a network in response to a webpage browsing request;
   determining, according to the comparing the domain name resolution information with the conforming attack rules, whether the webpage browsing request encounters a network attack; and
   in response to determining that the webpage browsing request encounters the network attack:
     discarding the domain name resolution information;
     sending the webpage browsing request to a proxy server;
     obtaining correct webpage data corresponding to the webpage browsing request by performing a network data transmission in a secure manner using the proxy server; and
   accessing a correct website based on the correct webpage data.

2. The method according to claim 1, wherein determining, according to the comparing the domain name resolution information with the conforming attack rules, whether the webpage browsing request encounters a network attack comprises:
   determining, according to the conforming attack rules and the domain name resolution information, legality of an IP address comprised in the domain name resolution information; and
   determining, according to the legality of the IP address comprised in the domain name resolution information, whether the webpage browsing request encounters a network attack, and if the IP address is legal, determining that the webpage browsing request encounters no network attack, or if the IP address is illegal, determining that the webpage browsing request encounters a network attack.

3. The method according to claim 2, wherein the determining, according to the conforming attack rules and the domain name resolution information, legality of an IP address comprised in the domain name resolution information comprises:

obtaining a target attack rule in the conforming attack rules by using the webpage browsing request, wherein the conforming attack rules comprise a domain name, an IP address, and a rule type identifier, and wherein a domain name comprised in the target attack rule is the same as a to-be-accessed domain name in the webpage browsing request;

traversing the target attack rule, to determine whether the IP address comprised in the domain name resolution information is comprised in the target attack rule; and if the IP address comprised in the domain name resolution information is not comprised in the target attack rule, determining that the IP address comprised in the domain name resolution information is legal; or if the IP address comprised in the domain name resolution information is comprised in the target attack rule, determining, according to the target attack rule, whether the IP address comprised in the domain name resolution information is legal, and if a rule type identifier, in the target attack rule, corresponding to the IP address comprised in the domain name resolution information is a legal identifier, determining that the IP address is legal, or if a rule type identifier, in the target attack rule, corresponding to the IP address comprised in the domain name resolution information is an illegal identifier, determining that the IP address is illegal.

4. The method according to claim 1, wherein determining, according to the comparing the domain name resolution information with the conforming attack rules, whether the webpage browsing request encounters a network attack comprises:

obtaining a target attack rule in the conforming attack rules by using the webpage browsing request, wherein the conforming attack rules comprise a tempering keyword, a non-tempered information expression, and a tempered information expression, and the non-tempered information expression comprised in the target attack rule corresponds to the webpage browsing request;

obtaining response information returned by the network according to the webpage browsing request;

traversing the target attack rule, to determine whether a response header keyword in the response information matches a tempering keyword in the target attack rule;

if the response header keyword in the response information matches the tempering keyword in the target attack rule, determining whether response header content in the response information matches a tempered information expression in the target attack rule; and if the response header content matches the tempered information expression in the target attack rule, determining that the webpage browsing request encounters a network attack.

5. The method according to claim 1, further comprising:
analyzing the conforming attack rules according to domain names included in the conforming attack rules to obtain a two-dimensional data structure of each conforming attack rule.

6. The method according to claim 1, wherein obtaining the correct webpage data comprises:

encrypting the webpage browsing request;

sending the encrypted webpage browsing request to the proxy server for the proxy server to decrypt the encrypted webpage browsing request to obtain the webpage browsing request, perform domain name resolution on the webpage browsing request, access a target server corresponding to a domain name resolution result, to obtain network data corresponding to the webpage browsing request, and encrypt the network data to obtain encrypted network data; and receiving the encrypted network data from the proxy server.

7. A network attack determining system, comprising one or more processors and one or more non-transitory computer-readable memories coupled to the one or more processors and configured with instructions executable by the one or more processors to cause the system to perform operations comprising:

determining conforming attack rules based on format analysis on attack rules transmitted by a rule configuration server;

comparing domain name resolution information with the conforming attack rules, wherein the domain name resolution information is returned by a network in response to a webpage browsing request;

determining, according to the comparing the domain name resolution information with the conforming attack rules, whether the webpage browsing request encounters a network attack; and in response to determining that the webpage browsing request encounters the network attack:
discarding the domain name resolution information;
sending the webpage browsing request to a proxy server;
obtaining correct webpage data corresponding to the webpage browsing request by performing a network data transmission in a secure manner using the proxy server; and
accessing a correct website based on the correct webpage data.

8. The system according to claim 7, wherein determining, according to the comparing the domain name resolution information with the conforming attack rules, whether the webpage browsing request encounters a network attack comprises:

determining, according to the conforming attack rules and the domain name resolution information, legality of an IP address comprised in the domain name resolution information; and determining, according to the legality of the IP address comprised in the domain name resolution information, whether the webpage browsing request encounters a network attack, and if the IP address is legal, determining that the webpage browsing request encounters no network attack, or if the IP address is illegal, determining that the webpage browsing request encounters a network attack.

9. The system according to claim 8, wherein the determining, according to the conforming attack rules and the domain name resolution information, legality of an IP address comprised in the domain name resolution information comprises:

obtaining a target attack rule in the conforming attack rules by using the webpage browsing request, wherein the conforming attack rules comprise a domain name, an IP address, and a rule type identifier, and wherein a domain name comprised in the target attack rule is the same as a to-be-accessed domain name in the webpage browsing request;
traversing the target attack rule, to determine whether the IP address comprised in the domain name resolution information is comprised in the target attack rule; and
if the IP address comprised in the domain name resolution information is not comprised in the target attack rule, determining that the IP address comprised in the domain name resolution information is legal; or
if the IP address comprised in the domain name resolution information is comprised in the target attack rule, determining, according to the target attack rule, whether the IP address comprised in the domain name resolution information is legal, and if a rule type identifier, in the target attack rule, corresponding to the IP address comprised in the domain name resolution information is a legal identifier, determining that the IP address is legal, or if a rule type identifier, in the target attack rule, corresponding to the IP address comprised in the domain name resolution information is an illegal identifier, determining that the IP address is illegal.

10. The system according to claim 7, wherein determining, according to the comparing the domain name resolution information with the conforming attack rules, whether the webpage browsing request encounters a network attack comprises:
obtaining a target attack rule in the conforming attack rules by using the webpage browsing request, wherein the conforming attack rules comprise a tempering keyword, a non-tempered information expression, and a tempered information expression, and the non-tempered information expression comprised in the target attack rule corresponds to the webpage browsing request;
obtaining response information returned by the network according to the webpage browsing request;
traversing the target attack rule, to determine whether a response header keyword in the response information matches a tempering keyword in the target attack rule;
if the response header keyword in the response information matches the tempering keyword in the target attack rule, determining whether response header content in the response information matches a tempered information expression in the target attack rule; and
if the response header content matches the tempered information expression in the target attack rule, determining that the webpage browsing request encounters a network attack.

11. The system according to claim 7, further comprising:
analyzing the conforming attack rules according to domain names included in the conforming attack rules to obtain a two-dimensional data structure of each conforming attack rule.

12. The system according to claim 7, wherein obtaining the correct webpage data comprises:
encrypting the webpage browsing request;
sending the encrypted webpage browsing request to the proxy server for the proxy server to decrypt the encrypted webpage browsing request to obtain the webpage browsing request, perform domain name resolution on the webpage browsing request, access a target server corresponding to a domain name resolution result, to obtain network data corresponding to the webpage browsing request, and encrypt the network data to obtain encrypted network data; and
receiving the encrypted network data returned by the proxy server.

13. A non-transitory computer-readable storage medium configured with instructions executable by one or more processors to cause the one or more processors to perform operations comprising:
determining conforming attack rules based on format analysis on attack rules transmitted by a rule configuration server;
comparing domain name resolution information with the conforming attack rules, wherein the domain name resolution information is returned by a network in response to a webpage browsing request;
determining, according to the comparing the domain name resolution information with the conforming attack rules, whether the webpage browsing request encounters a network attack; and
in response to determining that the webpage browsing request encounters the network attack:
discarding the domain name resolution information;
sending the webpage browsing request to a proxy server;
obtaining correct webpage data corresponding to the webpage browsing request by performing a network data transmission in a secure manner using the proxy server; and
accessing a correct website based on the correct webpage data.

14. The non-transitory computer-readable storage medium according to claim 13, wherein determining, according to the comparing the domain name resolution information with the conforming attack rules, whether the webpage browsing request encounters a network attack comprises:
determining, according to the conforming attack rules and the domain name resolution information, legality of an IP address comprised in the domain name resolution information; and
determining, according to the legality of the IP address comprised in the domain name resolution information, whether the webpage browsing request encounters a network attack, and if the IP address is legal, determining that the webpage browsing request encounters no network attack, or if the IP address is illegal, determining that the webpage browsing request encounters a network attack.

15. The non-transitory computer-readable storage medium according to claim 14, wherein the determining, according to the conforming attack rules and the domain name resolution information, legality of an IP address comprised in the domain name resolution information comprises:
obtaining a target attack rule in the conforming attack rules by using the webpage browsing request, wherein the conforming attack rules comprise a domain name, an IP address, and a rule type identifier, and wherein a domain name comprised in the target attack rule is the same as a to-be-accessed domain name in the webpage browsing request;
traversing the target attack rule, to determine whether the IP address comprised in the domain name resolution information is comprised in the target attack rule; and
if the IP address comprised in the domain name resolution information is not comprised in the target attack rule, determining that the IP address comprised in the domain name resolution information is legal; or if the IP address comprised in the domain name resolution information is comprised in the target attack rule, determining, according to the target attack rule, whether the IP address comprised in the domain name resolution information is legal, and if a rule type identifier, in the target attack rule, corresponding to the IP address comprised in the domain name resolution information is a legal identifier, determining that the IP address is legal, or if a rule type identifier, in the target attack rule, corresponding to the IP address comprised in the domain name resolution information is an illegal identifier, determining that the IP address is illegal.

16. The non-transitory computer-readable storage medium according to claim 13, wherein determining, according to the comparing the domain name resolution information with the conforming attack rules, whether the webpage browsing request encounters a network attack comprises:
   obtaining a target attack rule in the conforming attack rules by using the webpage browsing request, wherein the conforming attack rules comprise a tempering keyword, a non-tempered information expression, and a tempered information expression, and the non-tempered information expression comprised in the target attack rule corresponds to the webpage browsing request;
   obtaining response information returned by the network according to the webpage browsing request;
   traversing the target attack rule, to determine whether a response header keyword in the response information matches a tempering keyword in the target attack rule;
   if the response header keyword in the response information matches the tempering keyword in the target attack rule, determining whether response header content in the response information matches a tempered information expression in the target attack rule; and
   if the response header content matches the tempered information expression in the target attack rule, determining that the webpage browsing request encounters a network attack.

17. The non-transitory computer-readable storage medium according to claim 13, further comprising:
   analyzing the conforming attack rules according to domain names included in the conforming attack rules to obtain a two-dimensional data structure of each conforming attack rule.

18. The non-transitory computer-readable storage medium according to claim 13, wherein obtaining the correct webpage data comprises:
   encrypting the webpage browsing request;
   sending the encrypted webpage browsing request to the proxy server for the proxy server to decrypt the encrypted webpage browsing request to obtain the webpage browsing request, perform domain name resolution on the webpage browsing request, access a target server corresponding to a domain name resolution result, to obtain network data corresponding to the webpage browsing request, and encrypt the network data to obtain encrypted network data; and
   receiving the encrypted network data from the proxy server.

* * * * *

UNITED STATES PATENT AND TRADEMARK OFFICE
CERTIFICATE OF CORRECTION

| | | Page 1 of 1 |
|---|---|---|
| PATENT NO. | : 11,277,418 B2 | |
| APPLICATION NO. | : 16/773910 | |
| DATED | : March 15, 2022 | |
| INVENTOR(S) | : Lin | |

It is certified that error appears in the above-identified patent and that said Letters Patent is hereby corrected as shown below:

On the Title Page

Related U.S. Application Data:
Item (63) "Continuation of application No. 15/505,835, filed as application No. PCT/CN2016/078843 on Apr. 8, 2016, now Pat. No. 10,574,673." should read -- Continuation of application No. 15/505,835, filed on Feb. 22, 2017, now Pat. No. 10,574,673, which is a national stage entry of application No. PCT/CN2016/078843, filed on Apr. 8, 2016. --

Signed and Sealed this
Seventeenth Day of May, 2022

Katherine Kelly Vidal
*Director of the United States Patent and Trademark Office*